US012720054B2

(12) United States Patent
Cui et al.

(10) Patent No.: US 12,720,054 B2
(45) Date of Patent: Aug. 25, 2026

(54) FEATURE BASED TRANSFORM SELECTION

(71) Applicants: Beijing Bytedance Network Technology Co., Ltd., Beijing (CN); Bytedance Inc., Los Angeles, CA (US)

(72) Inventors: Jing Cui, Beijing (CN); Hongbin Liu, Beijing (CN); Li Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 32 days.

(21) Appl. No.: 18/492,203

(22) Filed: Oct. 23, 2023

(65) Prior Publication Data

US 2024/0064302 A1 Feb. 22, 2024

Related U.S. Application Data

(63) Continuation of application No. PCT/CN2022/088116, filed on Apr. 21, 2022.

(30) Foreign Application Priority Data

Apr. 22, 2021 (WO) ................ PCT/CN2021/088961

(51) Int. Cl.
*H04N 19/122* (2014.01)
*H04N 19/132* (2014.01)
(Continued)

(52) U.S. Cl.
CPC ......... *H04N 19/122* (2014.11); *H04N 19/132* (2014.11); *H04N 19/136* (2014.11);
(Continued)

(58) Field of Classification Search
CPC .... H04N 19/159; H04N 19/122; H04N 19/18; H04N 19/176; H04N 19/70; H04N 19/12;
(Continued)

(56) References Cited

U.S. PATENT DOCUMENTS

2003/0235248 A1* 12/2003 Kim ....................... H04N 19/86 375/240.18
2009/0147111 A1* 6/2009 Litvinov ................... G06T 5/20 348/E9.002

(Continued)

FOREIGN PATENT DOCUMENTS

CN 110392256 A 10/2019
CN 110771170 A 2/2020

(Continued)

OTHER PUBLICATIONS

Document: JVET-S2001-vH, Bross, B., et al., "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 548 pages.

(Continued)

*Primary Examiner* — Neil R Mikeska
(74) *Attorney, Agent, or Firm* — Conley Rose, P.C.

(57) ABSTRACT

In a method for processing visual data, a transform kernel of a current block of visual media is determined based on a feature of a neighboring area that neighbors the current block or based on a sub-region of the neighboring area. A conversion between the visual media and a bitstream of the visual media is performed based on the transform kernel.

20 Claims, 14 Drawing Sheets

100

(51) Int. Cl.

| | |
|---|---|
| ***H04N 19/136*** | (2014.01) |
| ***H04N 19/159*** | (2014.01) |
| ***H04N 19/167*** | (2014.01) |
| ***H04N 19/176*** | (2014.01) |
| ***H04N 19/186*** | (2014.01) |
| ***H04N 19/625*** | (2014.01) |
| ***H04N 19/70*** | (2014.01) |

(52) U.S. Cl.

CPC ......... *H04N 19/159* (2014.11); *H04N 19/167* (2014.11); *H04N 19/176* (2014.11); *H04N 19/186* (2014.11); *H04N 19/625* (2014.11); *H04N 19/70* (2014.11)

(58) Field of Classification Search

CPC .... H04N 19/46; H04N 19/132; H04N 19/167; H04N 19/14; H04N 19/136; H04N 19/186; H04N 19/625

See application file for complete search history.

(56) References Cited

U.S. PATENT DOCUMENTS

| | | | | |
|---|---|---|---|---|
| 2018/0220158 | A1* | 8/2018 | Koo | H04N 19/159 |
| 2019/0141351 | A1* | 5/2019 | Alakuijala | H04N 19/13 |
| 2021/0084301 | A1* | 3/2021 | Siekmann | H04N 19/176 |
| 2022/0210470 | A1* | 6/2022 | Lin | H04N 19/593 |
| 2022/0248006 | A1* | 8/2022 | Lim | H04N 19/176 |
| 2022/0408085 | A1* | 12/2022 | Lim | H04N 19/82 |
| 2023/0045182 | A1* | 2/2023 | De Lagrange | H04N 19/18 |

FOREIGN PATENT DOCUMENTS

| | | | |
|---|---|---|---|
| CN | 110933411 | A | 3/2020 |
| CN | 111093074 | A | 5/2020 |
| CN | 112106373 | A | 12/2020 |
| WO | 2019185883 | A1 | 10/2019 |

OTHER PUBLICATIONS

Document: JVET-K0099, Salehifar, M., et al., “CE 6.2.6: Reduced Secondary Transform (RST),” Joint Video Experts Team (JVET) of ITU-T SG 16 WP 3 and ISO/IEC JTC 1/SC 29/WG 11 11th Meeting: Ljubljana, SI, Jul. 10-18, 2018, 12 pages.

Document: JVET-L0133, Koo, M., et al., “CE 6-2.1: Reduced Secondary Transform (RST),” Joint Video Experts Team (JVET) of ITU-T SG 16 WP 3 and ISO/IEC JTC 1/SC 29/WG 11 12th Meeting: Macao, CN, Oct. 3-12, 2018, 8 pages.

Bossen, F., Retrieved from the internet: https://vcgit.hhi.fraunhofer.de/jvet/VVCSoftware_VTM/tags/VTM-11.0, Jan. 22, 2024, 1 page.

International Search Report from PCT Application No. PCT/CN2022/088116 dated Jul. 19, 2022, 11 pages.

Chinese Office Action from Chinese Patent Application No. 202280030418.X dated Apr. 24, 2026, 23 pages.

* cited by examiner

FEATURE BASED TRANSFORM SELECTION

CROSS-REFERENCE TO RELATED APPLICATIONS

This patent application is a continuation of International Patent Application No. PCT/CN2022/088116, filed on Apr. 21, 2022, which claims the priority to and benefits of International Application No. PCT/CN2021/088961 filed Apr. 22, 2021. All the aforementioned patent applications are hereby incorporated by reference in their entireties.

TECHNICAL FIELD

This patent document relates to generation, storage, and consumption of digital audio video media information in a file format.

BACKGROUND

Digital video accounts for the largest bandwidth used on the Internet and other digital communication networks. As the number of connected user devices capable of receiving and displaying video increases, the bandwidth demand for digital video usage is likely to continue to grow.

SUMMARY

A first aspect relates to a method for processing video data and comprising: determining a transform kernel of a current block based on a feature of a neighboring area that neighbors the current block or based on a sub-region of the neighboring area; and performing a conversion between visual media data and a bitstream based on the transform kernel.

Optionally, the neighboring area is adjacent to the current block.

Optionally, the neighboring area is non-adjacent to the current block.

Optionally, the neighboring area is a top neighboring area.

Optionally, the neighboring area is a left neighboring area.

Optionally, the neighboring area is a top-left neighboring area.

Optionally, the neighboring area is a top-right neighboring area.

Optionally, a size of the neighboring area is predetermined.

Optionally, a size of the neighboring area is assigned according to a size of the current block.

Optionally, a size of the neighboring area is assigned according to an intra mode of the current block.

Optionally, the sub-region is included in the neighboring area based on a top-left sample of the sub-region.

Optionally, the method further comprises extracting the feature from a reconstructed sample in the sub-region.

Optionally, the feature is based on classification information of the sub-region.

Optionally, the classification information is that the sub-region is a noise region, a smooth region, or an edge region.

Optionally, the feature is based on a difference between a first sample in one region and a second sample surrounding the first sample, by an average of a set of samples, or by edge information.

Optionally, the method further comprises classifying the sub-region as the noise region based on identification of jump points in the sub-region.

Optionally, the method further comprises classifying the sub-region as the smooth region based on identification of normal points in the sub-region.

Optionally, the method further comprises classifying the sub-region as the edge region based on identification of edge pixels in the sub-region.

Optionally, the feature is based on side information of the sub-region.

Optionally, the side information is a block size.

Optionally, the side information is a prediction mode.

Optionally, the transform kernel is discrete cosine transform type two (DCT2).

Optionally, the transform kernel is discrete cosine transform type seven (DCT7).

Optionally, the method further comprises determining whether to use feature-based transform selection (FTS) based on block dimensions or signaling in the bitstream.

Optionally, the method further comprises determining how to use feature-based transform selection (FTS) based on block dimensions or signaling in the bitstream.

A second aspect relates to non-transitory computer readable medium comprising a computer program product for use by a video coding device, the computer program product comprising computer executable instructions stored on the non-transitory computer readable medium such that when executed by a processor cause the video coding device to perform the method of any of the preceding aspects.

A third aspect relates to an apparatus for processing video data comprising: a processor; and a non-transitory memory with instructions thereon, wherein the instructions upon execution by the processor, cause the processor to perform the method of any of the preceding aspects.

A fourth aspect relates to a non-transitory computer-readable recording medium storing a bitstream of a video which is generated by a method performed by a video processing apparatus, wherein the method comprises: determining a transform kernel of a current block based on a feature of a neighboring area that neighbors the current block or based on a sub-region of the neighboring area; and performing a conversion between visual media data and a bitstream based on the transform kernel.

A fifth aspect relates to a method for storing bitstream of a video, comprising: determining a transform kernel of a current block based on a feature of a neighboring area that neighbors the current block or based on a sub-region of the neighboring area; and performing a conversion between visual media data and a bitstream based on the transform kernel.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

Versatile Video Coding (VVC), also known as H.266, terminology is used in some description only for ease of understanding and not for limiting scope of the disclosed techniques. As such, the techniques described herein are applicable to other video codec protocols and designs also. In the present document, editing changes are shown to text by bold italics indicating cancelled text and bold underline indicating added text, with respect to the VVC specification or International Organization for Standardization (ISO) base media file format (ISOBMFF) file format specification.

This disclosure is related to image/video coding technologies. More particularly, it is related to transform coding in video coding. It may be applied to the existing video coding standard like HEVC, or VVC (Versatile Video Coding), or the standard to be finalized. It may be also applicable to future video coding standards or video codec.

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure, wherein temporal prediction plus transform coding are utilized.

Figure 1:
FIG. 1 is an encoder block diagram of VVC.
Figure 1:
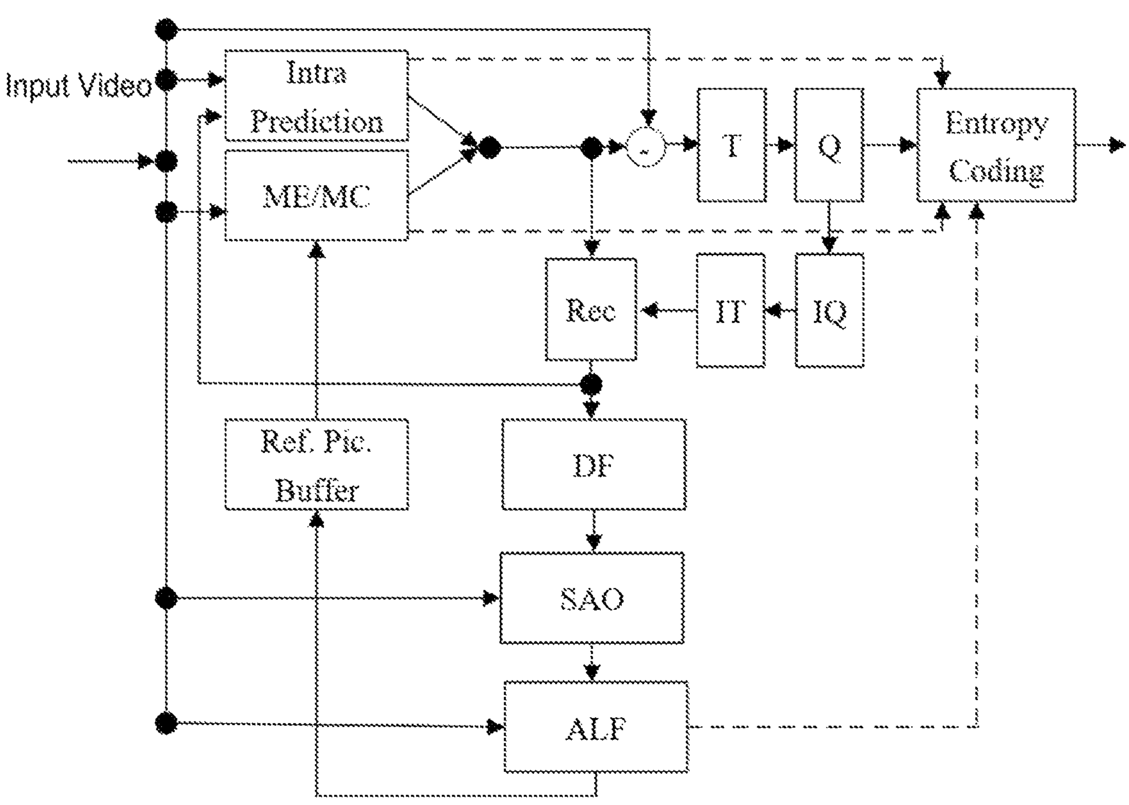

FIG. 1 is an encoder block diagram 100 of VVC. The encoder block diagram 100 contains three in-loop filtering blocks: deblocking filter (DF), sample adaptive offset (SAO), and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

The discrete sinusoidal transform families include the well-known discrete Fourier, cosine, sine, and the Karhunen-Loeve (under first-order Markov condition) transforms. Among all the members, there are 8 types of transforms based on cosine functions and 8 types of transforms based on sine functions, namely DCT-I, II, . . . , VIII, and DST-I, II, . . . , VIII, respectively. These variants of discrete cosine and sine transforms originate from the different symmetry of their corresponding symmetric-periodic sequences. The transform basis functions of selected types of DCT and DST, as utilized in the proposed methods, are formulated in Table 1.

TABLE 1

Transform basis functions of DCT-II/V/VIII and DSTI/VII for N-point input

| Transform Type | Basis function $T_i(j)$, i, j = 0, 1, . . . , N − 1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{N}} & i = 0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i = 0 \\ 1 & i \neq 0 \end{cases}, \omega_1 = \begin{cases} \sqrt{\frac{2}{N}} & j = 0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j)\sqrt{\frac{4}{2N+1}} \cdot \sin\left(\frac{\pi \cdot (2i+1) \cdot (j+1)}{2N+1}\right)$ |

The HEVC standard specifies core transform matrices of size 4×4, 8×8, 16×16, and 32×32 to be used for two-dimensional transforms in the context of block-based motion-compensated video compression. Like previous video coding standards, HEVC specifies two-dimensional transforms resembling the inverse discrete cosine transform (IDCT) for all transform sizes. Multiple transform sizes improve compression performance, but also increase the implementation complexity.

Discrete Sine Transform Type VII (DST-VII) approximates the optimal transform better than DCT-II along the prediction direction. In HEVC, 4×4 DST-VII has been adopted for coding luma Intra prediction residuals.

Figure 2:
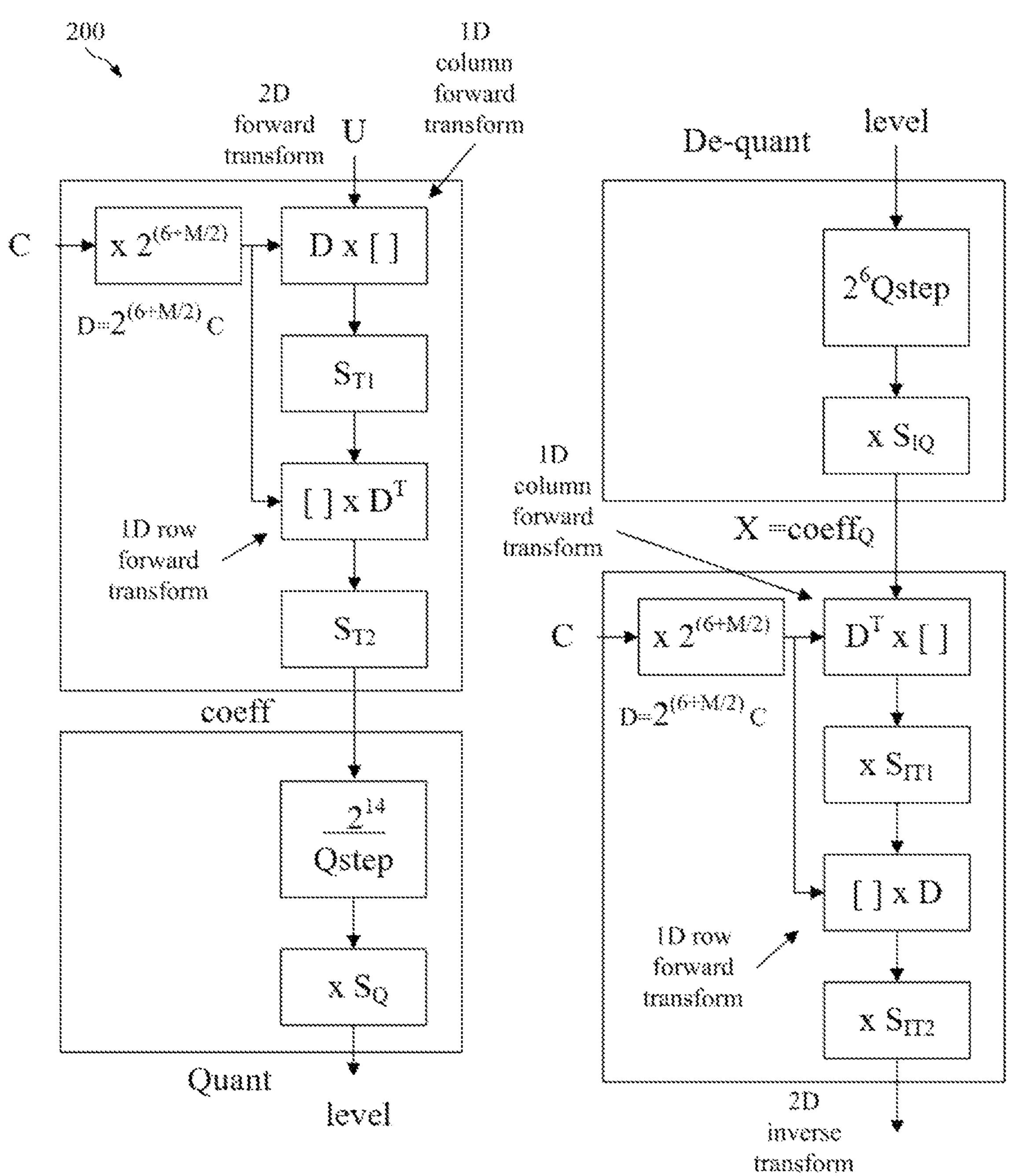
FIG. 2 is a schematic diagram of transforms and inverse transforms in HEVC.

FIG. 2 is a schematic diagram 200 of transforms and inverse transforms in HEVC. The transform process for a N×N block can be formulated as:

$$w_i = \sum_{j=0}^{N-1} u_j c_{ij},$$

where i=0, . . . , N−1. Elements $c_{ij}$ of the DCT transform matrix C are defined as:

$$c_{ij} = \frac{A}{\sqrt{N}} \cdot \cos\left[\frac{\pi \cdot i \cdot (2j+1)}{2N}\right],$$

where i,j=0, . . . , N−1 and where A is equal to 1 and $2^{1/2}$ for i=0 and i×0 respectively. Furthermore, the basis vectors $c_i$ of the DCT are defined as $c_i=[c_{i0}, c_{i1}, \ldots, c_{i(N-1)}]^T$, where i=0, . . . , N−1. In FIG. 2, M=log2(N), $S_{T1}=2^{-(B+M-9)}$, $S_{T2}=2^{-(M+6)}$, and B represents the bit-depth. After the first inverse transform stage, $S_{IT1}=2^{-7}$, and after the $2^{nd}$ inverse transform stage, $S_{IT2}=2^{-(20-B)}$.

For the output sample of the forward transform, coeff, a straightforward quantization scheme can be implemented as follows:

$$\text{level} = \left(\left(coeff_{QP\%6} + \text{offset}_Q\right) \gg \frac{QP}{6}\right) \gg shift2,$$

where shift2=29−M−B and $S_Q=2^{-shift2}$ in FIG. 2. In addition, the following settings are applied in the quantization process:

$$Qstep(QP) = \left(2^{1/6}\right)^{QP-4} = G_{QP\%6} \ll (QP/6)$$

$$F = [f_0, f_1, \ldots, f_5] = [26214, 23302, 20560, 18396, 16384, 14564]$$

$$G = [G_0, G_1, \ldots, G_5] = \left[2^{-4/6}, 2^{-3/6}, 2^{-2/6}, 2^{-1/6}, 2^0, 2^{1/6}\right].$$

$f_{QP\ \%6} \approx 2^{14}/G_{QP\ \%6}$. For a quantizer output, level, the de-quantizer is specified in the HEVC standard as:

$$coeff_Q = \left(\left(\text{level} * \left(g_{QP\%6} \ll \frac{QP}{6}\right)\right) + \text{offset}_{IQ}\right) \gg shift1,$$

where shift1=M−9+B and $S_{IQ}=2^{-shift1}$ in FIG. 2. In addition, the following settings are applied in the de-quantization process:

$$g_{QP\%6} = \text{round}\left(2^6 \times G_{QP\%6}\right),$$

$$g = [g_0, g_1, \ldots, g_5] = [40, 45, 51, 57, 64, 71].$$

In HEVC, only square transform block is allowed, i.e., the width and height of transform block are always equal. Therefore, the shifts and multipliers in FIG. 2, $2^M*2^M$ blocks are defined in Tables 2a and 2b.

TABLE 2a

| Parameter definitions in transform process for HEVC for the forward transform | Scale Factor |
|---|---|
| First forward transform stage | $2^{(6+M/2)}$ |
| After the first forward transform stage ($S_{T1}$) | $2^{-(M+B-9)}$ |
| Second forward transform stage | $2^{(6+M/2)}$ |
| After second forward transform stage ($S_{T2}$) | $2^{-(M+6)}$ |
| Total scaling for the forward transform | $2^{(15-B-M)}$ |

TABLE 2b

| Parameter definitions in transform process for HEVC for the inverse transform | Scale Factor |
|---|---|
| First inverse transform stage | $2^{(6+M/2)}$ |
| After the first inverse transform stage ($S_{IT1}$) | $2^{-7}$ |
| Second inverse transform stage | $2^{(6+M/2)}$ |
| After second inverse transform stage ($S_{IT2}$) | $2^{-(20-B)}$ |
| Total scaling for the inverse transform | $2^{-(15-B-M)}$ |

In VVC, the process of transform/quantization/de-quantization/inverse transform is similar to that in HEVC as demonstrated in FIG. 2. Different from HEVC, the rectangular blocks are supported in VVC, wherein the width and height may be different. Supposing the width and height of a transform block are W and H, respectively, then:

$$S_{T1} = 2^{-(\lfloor log_2 W \rfloor + B - 9)} S_{T2} = 2^{-(\lfloor log_2 H \rfloor + 6)}.$$

$$S_{T1} = 2^{-(\lfloor log_2 W \rfloor + B - 9)} S_{T2} = 2^{-(\lfloor \log_2 H \rfloor + 6)}$$

Shifts and multipliers in FIG. 2 for VVC are then modified accordingly, as presented in Tables 3a and 3b.

TABLE 3a

| Parameter definitions in transform process for VVC for the forward transform | Scale Factor |
|---|---|
| First forward transform stage | $2^{(6+\lfloor log_2 W \rfloor/2)}$ |
| After the first forward transform stage ($S_{T1}$) | $2^{-(\lfloor log_2 W \rfloor + B - 9)}$ |
| Second forward transform stage | $2^{(6+\lfloor log_2 H \rfloor/2)}$ |
| After second forward transform stage ($S_{T2}$) | $2^{-(\lfloor log_2 H \rfloor + 6)}$ |
| Total scaling for the forward transform | $2^{15-B-(\lfloor log_2 W \rfloor + \lfloor log_2 H \rfloor)/2}$ |

TABLE 3b

| Parameter definitions in transform process for VVC for the inverse transform | Scale Factor |
|---|---|
| First inverse transform stage | $2^{(6+\lfloor log_2 W \rfloor/2)}$ |
| After the first inverse transform stage ($S_{IT1}$) | $2^{-7}$ |
| Second inverse transform stage | $2^{(6+\lfloor log_2 H \rfloor/2)}$ |
| After second inverse transform stage ($S_{IT2}$) | $2^{-(20-B)}$ |
| Total scaling for the inverse transform | $2^{-(15-B-(\lfloor log_2 W \rfloor + \lfloor log_2 H \rfloor)/2)}$ |

Comparing to HEVC, when $\lfloor log_2 W \rfloor + \lfloor log_2 H \rfloor$ is an even number, the same quantization/dequantization factors can be used. If $\lfloor log_2 W \rfloor + \lfloor log_2 H \rfloor$ is an odd number, a factor of $2^{1/2}$ must be compensated at the quantization/dequantization stage. If $\lfloor log_2 W \rfloor + \lfloor log_2 H \rfloor$ is an odd number, $f'=[f'_0, f'_1, \ldots, f'_5]$=[18396,16384,14564,13107,11651,10280] is used instead off, and g'=[g'$_0$, g'$_1$, . . . , g'$_5$]=[57,64,72,80,90, 102] is used instead of g. f'≈f×$2^{-1/2}$ and g'≈g×$2^{1/2}$.

In addition to DCT-II, which has been employed in HEVC, a Multiple Transform Selection (MTS) scheme is used for residual coding both inter and intra coded blocks. It uses multiple selected transforms from DCT8/DST7. The newly introduced transform matrices are DST-VII (DST7) and DCT-VIII (DCT8). Table 1 shows the basis functions of the selected DST/DCT. There are two ways to enable MTS, one is implicit MTS; and the other is explicit MTS.

Implicit MTS is a tool adopted in VVC. Whether to enable implicit MTS is dependent on the value of a variable implicitMtsEnabled. When implicitMtsEnabled is set equal to 1, the implicit MTS is applied. Implicit MTS is only applicable to intra-coded blocks. The variable implicitMtsEnabled is derived as follows: If sps_mts_enabled_flag is equal to 1 and one or more of the following conditions are true, implicitMtsEnabled is set equal to 1: IntraSubPartitionsSplitType is not equal to ISP_NO_SPLIT; cu_sbt_flag is equal to 1 and Max(nTbW, nTbH) is less than or equal to 32; or sps_explicit_mts_intra_enabled_flag is equal to 0 and CuPredMode[0][xTbY][yTbY] is equal to MODE_INTRA and lfnst_idx is equal to 0 and IntraMipFlag[x0][y0] is equal to 0. Otherwise, implicitMtsEnabled is set equal to 0.

The variable trTypeHor specifying the horizontal transform kernel and the variable trTypeVer specifying the vertical transform kernel are derived as follows: If one or more of the following conditions are true, trTypeHor and trTypeVer are set equal to 0: cIdx is greater than 0; or IntraSubPartitionsSplitType is not equal to ISP_NO_SPLIT and lfnst_idx is not equal to 0. Otherwise, if implicitMtsEnabled is equal to 1, the following applies: If cu_sbt_flag is equal to 1, trTypeHor and trTypeVer are specified in Table 4 depending on cu_sbt_horizontal_flag and cu_sbt_pos_flag.

TABLE 4

Specification of trTypeHor and trType Ver depending on cu_sbt_horizontal_flag and cu_sbt_pos_flag

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

Otherwise (cu_sbt_flag is equal to 0), trTypeHor and trTypeVer are derived as follows:

$$trTypeHor = (nTbW >= 4\ \&\&\ nTbW <= 16)?1:0$$

$$trTypeVer = (nTbH >= 4\ \&\&\ nTbH <= 16)?1:0$$

Otherwise, trTypeHor and trTypeVer are specified in Table 5 depending on mts_idx.

TABLE 5

Specification of trTypeHor and trTypeVer depending on mts_idx

| mts_idx | 0 | 1 | 2 | 3 | 4 |
|---|---|---|---|---|---|
| trTypeHor | 0 | 1 | 2 | 1 | 2 |
| trType Ver | 0 | 1 | 1 | 2 | 2 |

The variable trTypeHor specifying the horizontal transform kernel and the variable trTypeVer specifying the vertical transform kernel are derived as follows: If one or more of the following conditions are true, trTypeHor and trTypeVer are set equal to 0: cIdx is greater than 0; or IntraSubPartitionsSplitType is not equal to ISP_NO_SPLIT and lfnst_idx is not equal to 0. Otherwise, if implicitMtsEnabled is equal to 1, the following applies: If cu_sbt_flag is equal to 1, trTypeHor and trTypeVer are specified in Table 4 depending on cu_sbt_horizontal_flag and cu_sbt_pos_flag. Otherwise (cu_sbt_flag is equal to 0), trTypeHor and trTypeVer are derived as follows:

$$trTypeHor = (nTbW >= 4\ \&\&\ nTbW <= 16)?1:0$$

$$trTypeVer = (nTbH >= 4\ \&\&\ nTbH <= 16)?1:0$$

Otherwise, trTypeHor and trTypeVer are specified in Table 5 depending on mts_idx. The variables nonZeroW and nonZeroH are derived as follows: If ApplyLfnstFlag[cIdx] is equal to 1, the following applies:

$$nonZeroW = (nTbW == 4 || nTbH == 4)?4:8$$

$$nonZeroH = (nTbW == 4 || nTbH == 4)?4:8$$

Otherwise, the following applies:

$$nonZeroW = \mathrm{Min}(nTbW, (trTypeHor > 0)?16:32)$$

$$nonZeroH = \mathrm{Min}(nTbH, (trTypeVer > 0)?16:32)$$

To control the MTS scheme, one flag is used to specify whether explicit MTS for intra/inter is present in a bitstream. In addition, two separate enabling flags are specified at the sequence parameter set (SPS) level for intra and inter, respectively, to indicate whether explicit MTS is enabled. When MTS is enabled at the SPS level, a coding unit (CU)-level transform index may be signaled to indicate whether MTS is applied or not. Here, MTS is applied only for luma. The MTS CU level index (denoted by mts_idx) is signaled when the following conditions are satisfied: both width and height smaller than or equal to 32; Coded block flag (CBF) luma flag is equal to one; Non-TS; Non-ISP; non-SBT; LFNST is disabled; non-zero coefficient is existing which is not in the DC position (top-left position of a block); and there are no non-zero coefficients outside the top-left 16×16 region.

If the 1st bin of mts_idx is equal to zero, then DCT2 is applied in both directions. However, if the 1st bin of the mts_idx is equal to one, then two more bins are additionally signaled to indicate the transform type for the horizontal and vertical directions, respectively. Transform and signaling mapping is shown in Table 6.

TABLE 6

Signaling of MTS

| | | | Intra/inter | | |
|---|---|---|---|---|---|
| $0^{th}$-bin | $1^{st}$-bin | $2^{nd}$-bin | Horizontal | Vertical | mts_idx |
| 0 | | | DCT2 | | 0 |
| 1 | 0 | 0 | DST7 | DST7 | 1 |

TABLE 6-continued

| Signaling of MTS | | | | | |
|---|---|---|---|---|---|
| | | | Intra/inter | | |
| $0^{th}$-bin | $1^{st}$-bin | $2^{nd}$-bin | Horizontal | Vertical | mts_idx |
| | 0 | 1 | DCT8 | DST7 | 2 |
| | 1 | 0 | DST7 | DCT8 | 3 |
| | 1 | 1 | DCT8 | DCT8 | 4 |

8-bit primary transform cores are used for transform matrix precision. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

To reduce the complexity of large-size DST-7 and DCT-8, high frequency transform coefficients are zeroed out for the DST-7 and DCT-8 blocks with size (width or height, or both width and height) equal to 32. Only the coefficients within the 16×16 lower-frequency region are retained.

As in HEVC, the residual of a block can be coded with transform skip mode. To avoid the redundancy of syntax coding, the transform skip flag is not signaled when the CU level MTS_CU_flag is not equal to zero. The block size limitation for transform skip is the same as that for MTS in JEM4, which indicates that transform skip is applicable for a CU when both block width and height are equal to or less than 32.

In VVC test model eight (VTM8), large block-size transforms, up to 64×64 in size, are enabled, which is primarily useful for higher-resolution video, e.g., 1080p and 4K sequences. High-frequency transform coefficients of blocks with DCT2 transform applied are zeroed out for the transform blocks with size (width or height, or both width and height) no smaller than 64, so that only the lower-frequency coefficients are retained. All other coefficients are forced to be zeros without being signaled. For example, for an M×N transform block, with M as the block width and N as the block height, when M is no smaller than 64, only the left 32 columns of transform coefficients are kept. Similarly, when N is no smaller than 64, only the top 32 rows of transform coefficients are kept.

High-frequency transform coefficients of blocks with DCT8 or DST7 transform applied are zeroed out for the transform blocks with size (width or height, or both width and height) no smaller than 32, so that only the lower-frequency coefficients are retained, all other coefficients are forced to be zeros without being signaled. For example, for an M×N transform block, with M as the block width and N as the block height, when M is no smaller than 32, only the left 16 columns of transform coefficients are kept. Similarly, when N is no smaller than 32, only the top 16 rows of transform coefficients are kept.

Figure 3:
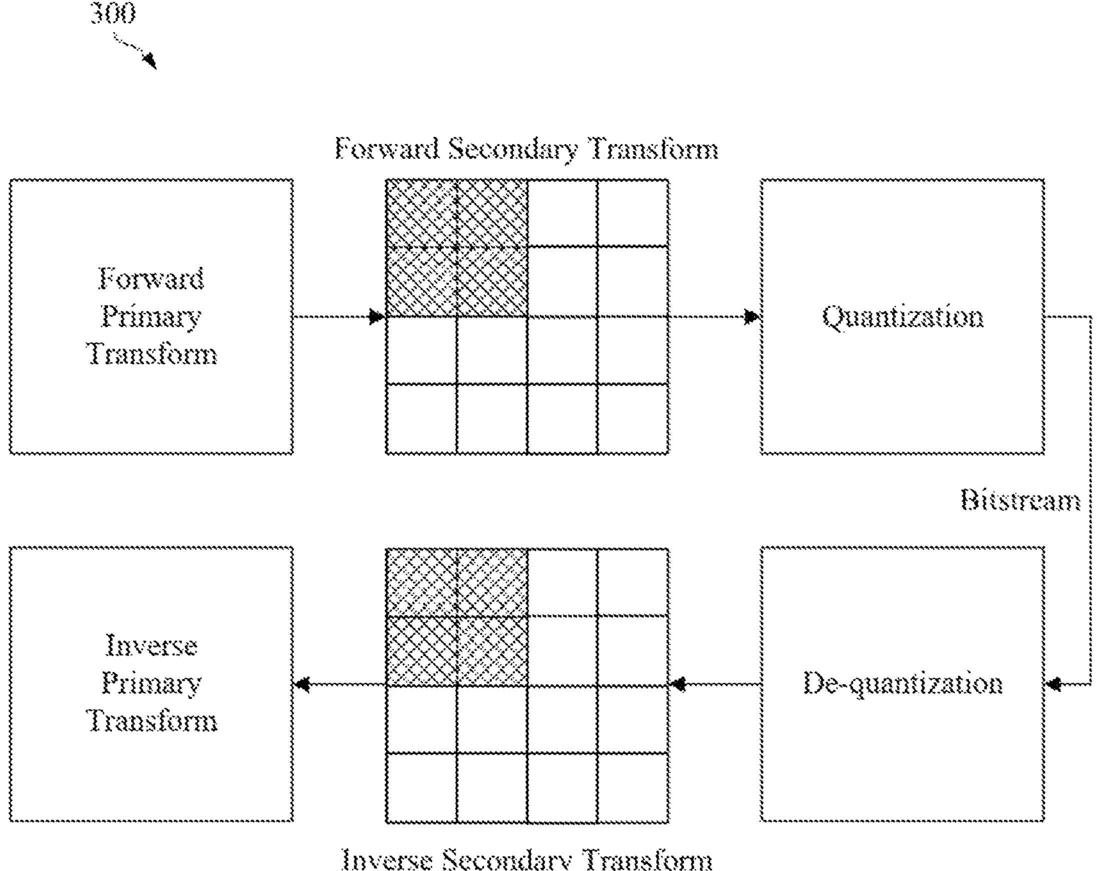
FIG. 3 is a schematic diagram of a secondary transform in Joint Exploration Model (JEM).

FIG. 3 is a schematic diagram of a secondary transform 300 in JEM. In JEM, the secondary transform is applied between forward primary transform and quantization (at encoder) and between de-quantization and inverse primary transform (at decoder side). As shown in FIG. 3, whether a 4×4 or an 8×8 secondary transform is performed depends on block size. For example, a 4×4 secondary transform is applied for small blocks (i.e., min (width, height)<8), and 8×8 secondary transform is applied for larger blocks (i.e., min (width, height)>4) per 8×8 block.

Application of a non-separable transform is described as follows using an input block from an input picture as an example. To apply the non-separable transform, the 4×4 input block X is first represented as a vector $\vec{X}$ as follows:

$$X = \begin{matrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{matrix}$$

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T.$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform candidate is further specified by the explicitly signaled secondary transform index. The index is signaled in a bit-stream once per Intra CU after transform coefficients.

Figure 4:
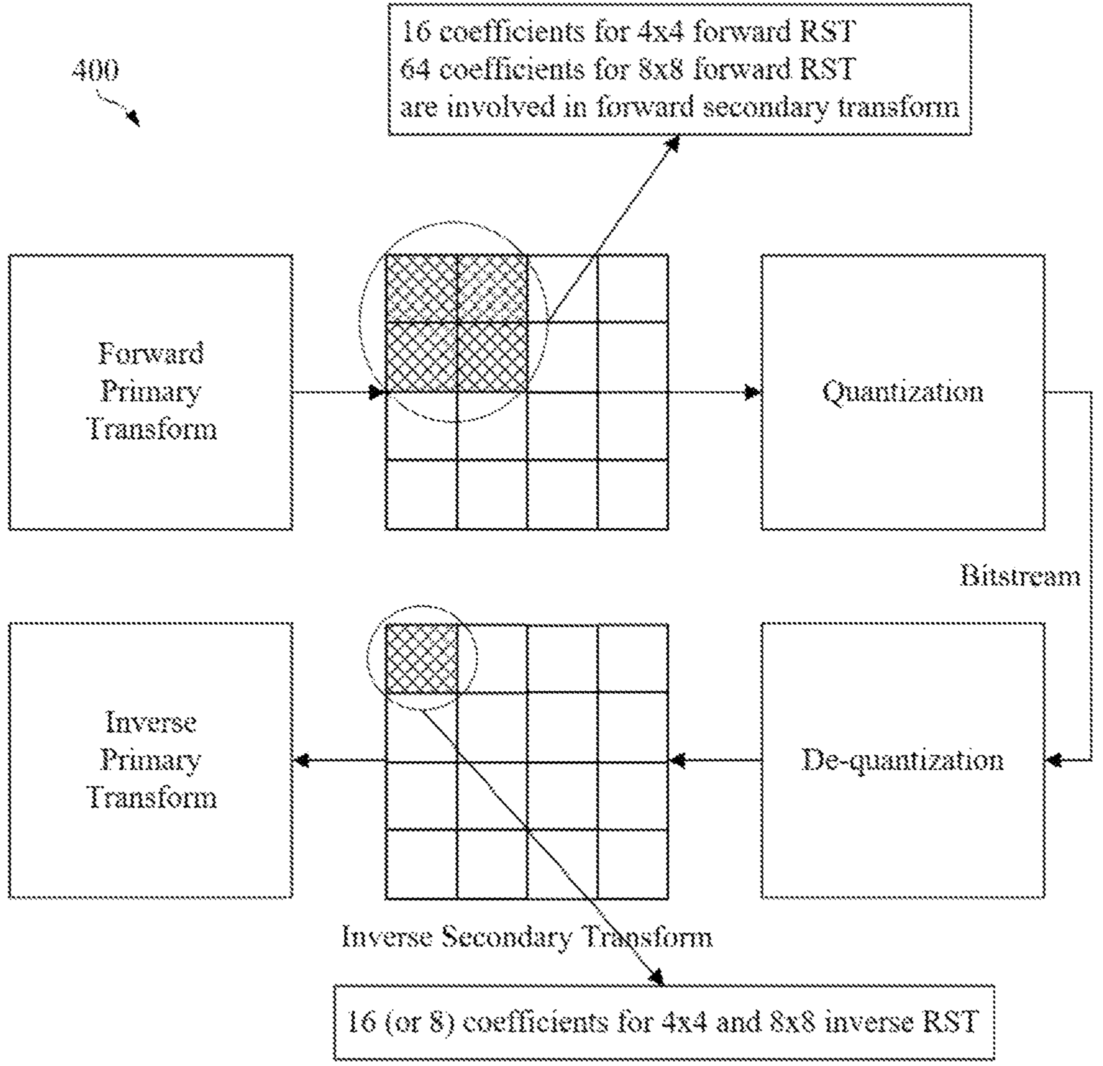
FIG. 4 is a schematic diagram of an example low-frequency non-separable transform (LFNST).

FIG. 4 is a schematic diagram of an example LFNST 400. The LFNST was introduced in Joint Video Experts Team (JVET)-K0099, and 4-transform-set (instead of 35 transform-set) mapping was introduced in JVET-L0133. In JVET-N0193, 16×64 (may further be reduced to 16×48) and 16×16 matrices are employed for 8×8 and 4×4 blocks, respectively. For notational convenience, the 16×64 (may further be reduced to 16×48) transform is denoted as LFNST8×8, and the 16×16 one as LFNST4×4.

Figure 5:
FIG. 5 is a schematic diagram of a forward and an inverse reduced transform (RT).
Figure 5:
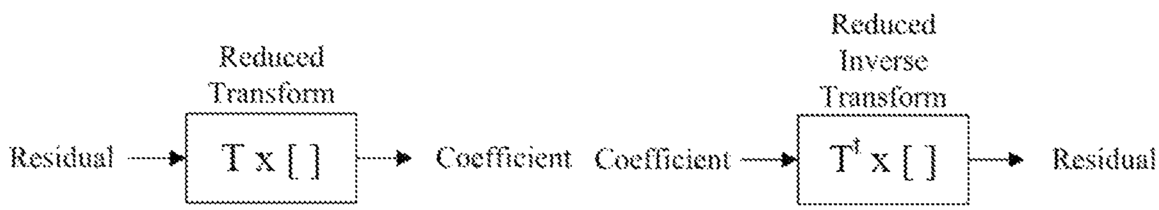

FIG. 5 is a schematic diagram of a forward and an inverse reduced transform (RT) 500. The main idea of RT is to map an N-dimensional vector to an R-dimensional vector in a different space, where R/N (R<N) is the reduction factor. The RT matrix is an R×N matrix as follows:

$$T_{R \times N} = \begin{bmatrix} t_{11} & t_{12} & t_{13} & \dots & t_{1N} \\ t_{21} & t_{22} & t_{23} & \dots & t_{2N} \\ \vdots & \vdots & \vdots & \ddots & \ddots \\ t_{R1} & t_{R2} & t_{R3} & \dots & t_{RN} \end{bmatrix},$$

where the R rows of the transform are R bases of the N-dimensional space. The inverse transform matrix for RT is the transpose of its forward transform.

Here, the LFNST8×8 with a reduction factor of 4 (¼ size) is applied. Hence, instead of 64×64, which is conventional 8×8 non-separable transform matrix size, 16×64 direct matrix is used. In other words, the 64×16 invert LFNST matrix is used at the decoder side to generate core (primary) transform coefficients in 8×8 top-left regions. The forward LFNST8×8 uses 16×64 (or 8×64 for 8×8 block) matrices so that it produces non-zero coefficients only in the top-left 4×4 region within the given 8×8 region. In other words, if LFNST is applied, then the 8×8 region except the top-left 4×4 region will have only zero coefficients. For LFNST4×4, 16×16 (or 8×16 for 4×4 block) direct matrix multiplication is applied.

An invert LFNST is conditionally applied when the following two conditions are satisfied: 1) block size is greater than or equal to the given threshold (W>=4&&H>=4), and 2) transform skip mode flag is equal to zero. If both the width (W) and height (H) of a transform coefficient block is greater than 4, then the LFNST8×8 is applied to the top-left 8×8 region of the transform coefficient block. Otherwise, the LFNST4×4 is applied on the top-left min(8, W)×min(8, H) region of the transform coefficient block. If LFNST index is equal to 0, LFNST is not applied. Otherwise, LFNST is applied, of which kernel is chosen with the LFNST index. The LFNST selection method and coding of the LFNST index are described below.

Furthermore, LFNST is applied for intra CU in both intra and inter slices, and for both luma and chroma. If a dual tree is enabled, LFNST indices for luma and chroma are signaled separately. For inter slice (the dual tree is disabled) or I slice with dual tree disabled (i.e., single tree), a single LFNST index is signaled and used for luma only.

In the 13$^{th}$ JVET meeting, Intra Sub-Partitions (ISP) was adopted as a new intra prediction mode. When ISP mode is selected, LFNST is disabled and LFNST index is not signaled because performance improvement was marginal even if LFNST is applied to every feasible partition block. Furthermore, disabling LFNST for ISP-predicted residual could reduce encoding complexity.

An LFNST matrix is chosen from four transform sets, each of which consists of two transforms. Which transform set is applied is determined from intra prediction mode as the following: If one of three cross-component linear model (CCLM) modes is indicated, transform set 0 is selected. Otherwise, transform set selection is performed according to Table 7.

TABLE 7

Transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode | 1 |

The index to access Table 7, denoted as IntraPredMode, has a range of [−14, 83], which is a transformed mode index used for wide angle intra prediction.

Figure 6:
FIG. 6 is a schematic diagram of an example of a forward LFNST 8×8 process with a 16×48 matrix.
Figure 6:
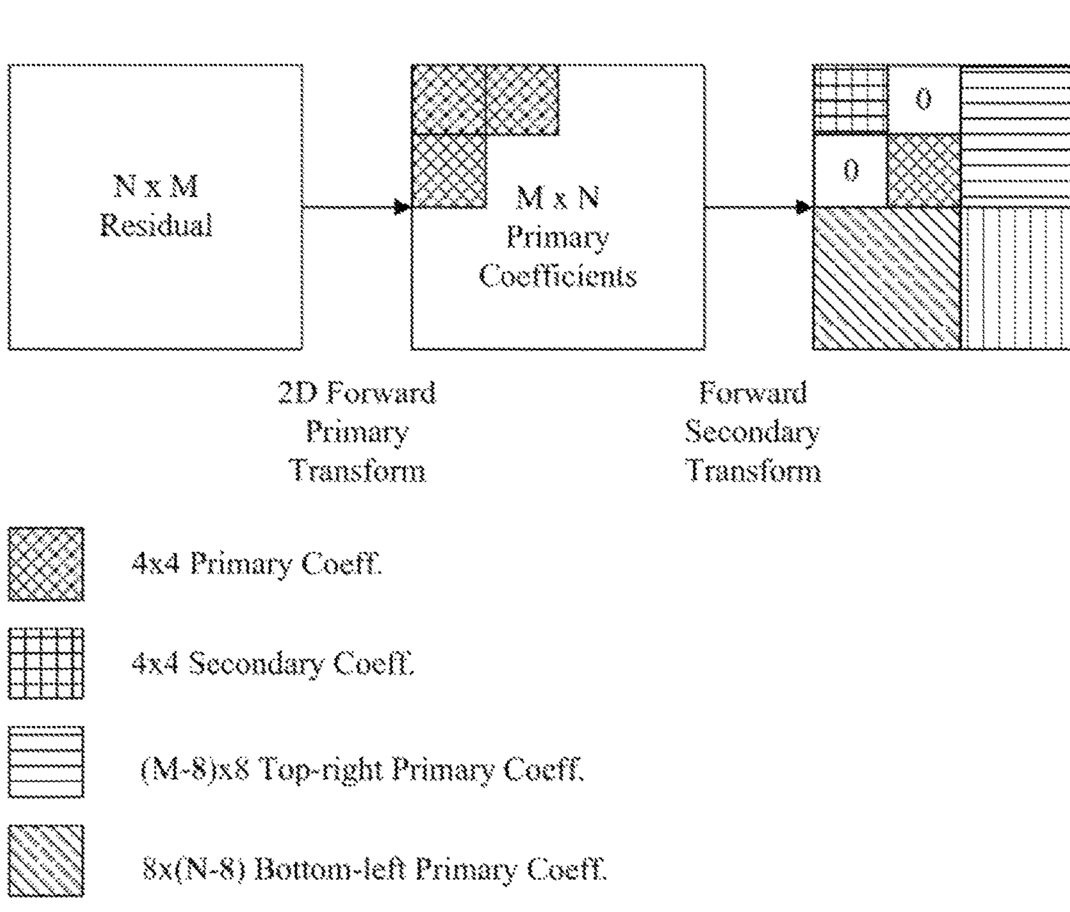

FIG. 6 is a schematic diagram of an example of a forward LFNST 8×8 process 600 with a 16×48 matrix. As a further simplification, 16×48 matrices are applied instead of 16×64 with the same transform set configuration, each of which takes 48 input data from three 4×4 blocks in a top-left 8×8 block excluding right-bottom 4×4 block as shown.

Figure 7:
FIG. 7 is a schematic diagram of an example scanning mechanism used to support signaling of a LFNST.
Figure 7:
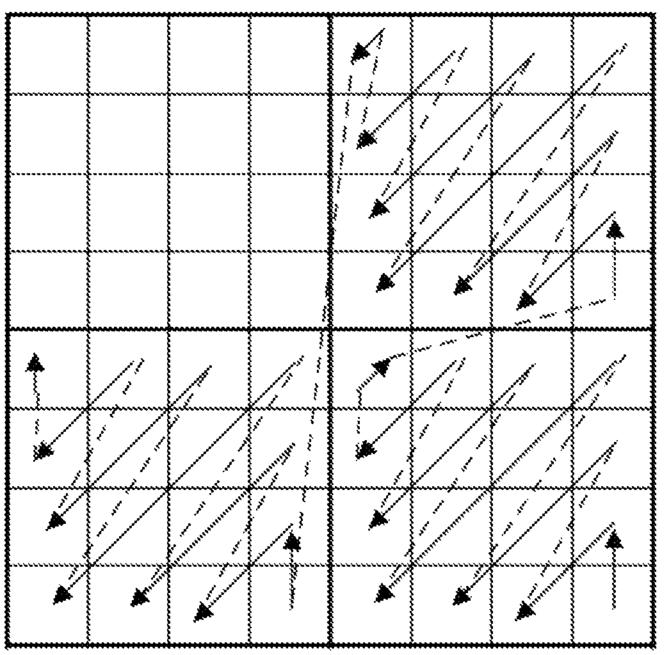

FIG. 7 is a schematic diagram of an example scanning mechanism 700 used to support signaling of a LFNST. The forward LFNST 8×8 with R=16 uses 16×64 matrices so that it produces non-zero coefficients only in the top-left 4×4 region within the given 8×8 region. In other words, if the LFNST is applied, then the 8×8 region except the top-left 4×4 region generates only zero coefficients. As a result, as shown, the LFNST index is not coded when any non-zero element is detected within an 8×8 block region other than top-left 4×4 because it implies that the LFNST was not applied. In such a case, the LFNST index is inferred to be zero.

Usually, before applying the inverse LFNST on a 4×4 sub-block, any coefficient in the 4×4 sub-block may be non-zero. However, a constraint may be applied that, in some cases, some coefficients in the 4×4 sub-block must be zero before the inverse LFNST is applied on the sub-block. Let nonZeroSize be a variable. A rule may require that any coefficient with the index no smaller than nonZeroSize must be zero when the coefficient is rearranged into a 1-D array before application of the inverse LFNST. When nonZeroSize is equal to 16, there is no zero-out constraint on the coefficients in the top-left 4×4 sub-block. When the current block size is 4×4 or 8×8, nonZeroSize is set equal to 8. For other block dimensions, nonZeroSize is set equal to 16.

The current implicit MTS design only considers the width and height of a coding block (transform block). It uses DST7 as the transform kernel for the given block with width or height larger than or equal to 4 and smaller than or equal to 16. This design is easy for implementation, but may not be efficient because it does not consider the content characteristics or residual characteristics of the coding block.

Disclosed herein are mechanisms to address one or more of the problems listed above. The disclosed embodiments implement feature-based transform selection (FTS). In FTS, transform kernels of a current block are selected according to features extracted from a neighboring area of the current block. The neighboring area may be adjacent or non-adjacent to the current block. In the following description, the width and height of the current block are denoted by W and H, respectively. For example, the current block may refer to a top neighboring area, a left neighboring area, a top-left neighboring area, a top-right neighboring area, or a non-adjacent area of the current block. For example, the current block may refer to a sub-region located in a neighboring area. For example, a sub-region may be classified into a specific category by classification information, and the classification information may be used to choose a transform kernel for the current block. For example, a classification procedure may depend on a feature extracted from the sub-region. For example, a sub-region may be classified as a noise region, a smooth block, or an edge region. For example, in addition to classification information, the transform kernel of the current block is selected according to other relative side information such as block size or prediction mode. Accordingly, to address the problems mentioned above, several methods are disclosed. The methods result in achieving better coding performance.

The detailed embodiments below should be considered as examples to explain general concepts. The embodiments should not be interpreted in a narrow way. Furthermore, the embodiments can be combined in any manner.

Example 1

A current block refers to a neighboring area of the current block. The neighboring area is a top neighboring area, a left neighboring area, a top-left neighboring area, a top-right neighboring area, or a non-adjacent area of the current block. The neighboring area may be rectangular with width $W_1$ and height $H_1$. $W_1$ and $H_1$ may be the same. While areas such as neighboring areas are discussed, blocks may be used instead.

Figure 8:
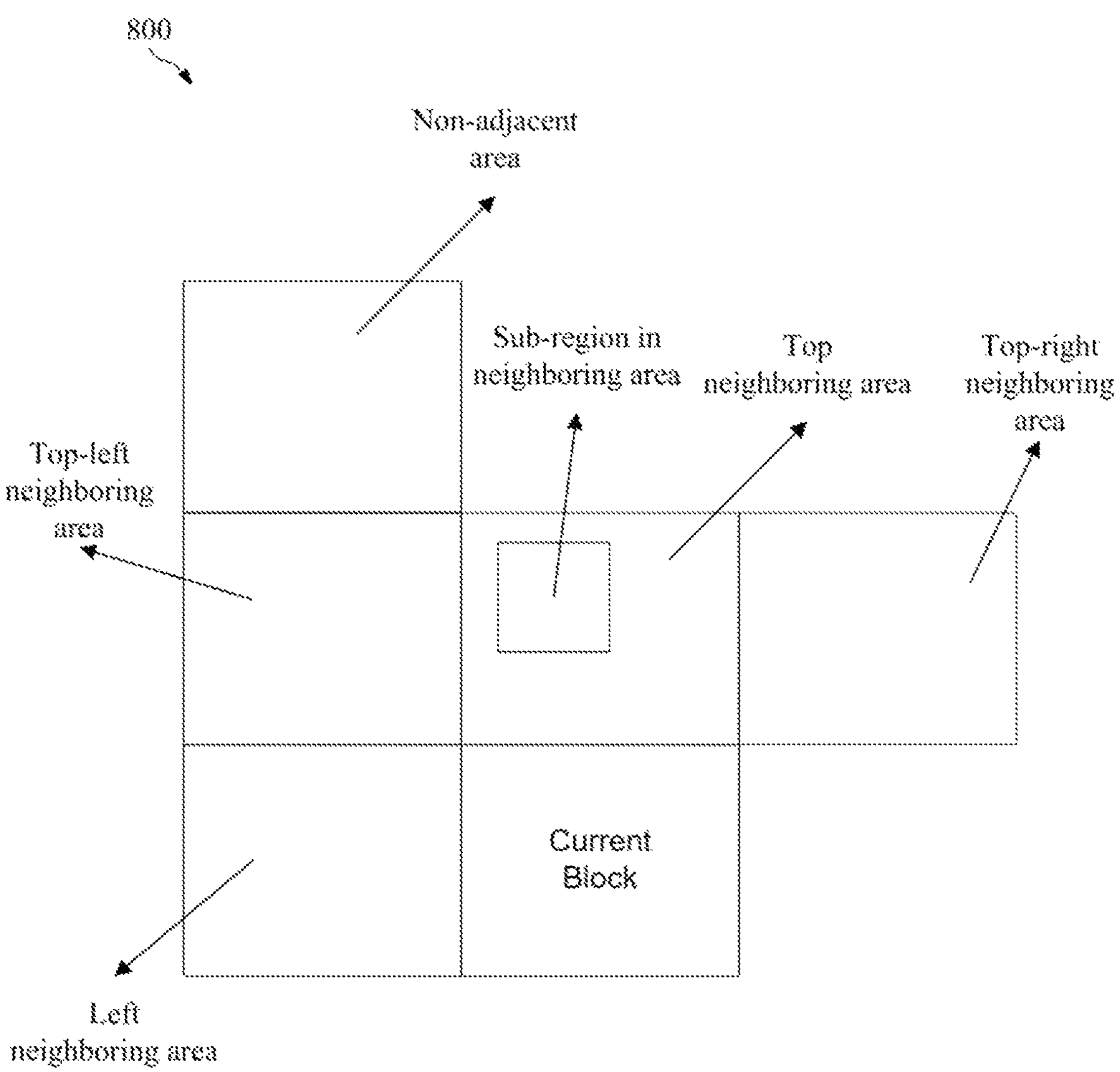
FIG. 8 is a schematic diagram of a current block and its neighboring areas and non-adjacent area.

FIG. 8 is a schematic diagram 800 of a current block and its neighboring areas and non-adjacent area. The current block is in the center and is surrounded by a top neighboring area, a left neighboring area, a top-left neighboring area, a top-right neighboring area, and a non-adjacent area. Within the top neighboring area is a sub-region. While FIG. 8 shows the current block and its neighboring and non-adjacent areas as being square, they may also be rectangular.

Example 1a $W_1$ and $H_1$ are predetermined. For instance, $W_1$ and $H_1$ is set equal to 4, 8, 16, 32, etc.

Example 1b

The size of the neighboring area is assigned according to a size of the current block. For instance, the size is $W_1*H_1$ (i.e., the same dimensions as the current block), $W_1*2*H_1$ (i.e., the width is the same as for the current block, but the height is twice that of the current block), $2*W_1*H_1$ (i.e., the width is twice that of the current block, but the height is the same as for the current block), etc.

Example 1c

The size of the neighboring area is adaptively assigned according to an intra mode of the current block.

Example 2

A sub-region may be included in a neighboring area based on a top-left sample of the sub-region. A sub-region may be located within each neighboring area. A sub-region should be a rectangular region. w and h denote the respective width and height of a sub-region, and $w<=W_1$, $h<=H_1$.

Example 3

Features extracted from reconstructed samples in a sub-region are used to determine a transform kernel.

Example 3a

A sub-region may be classified into a specific category by classification information. The classification information may be used to choose a transform kernel for the current block.

Example 3b

A sub-region may be classified as a noise region, a smooth region, or an edge region.

Example 4

A classification procedure may depend on a feature extracted from the sub-region. A feature may be defined by the difference between a first sample in one region and a second sample surrounding the first sample, by an average of a set of samples, or by edge information. Edges of neighboring areas may be first detected, then samples may be classified as an edge sample or a non-edge sample. For instance, if the distance between a sample and an edge is less than a threshold, then the sample may be classified as an edge sample.

Example 5

A sub-region may be classified as a noise region based on identification of jump points.

Example 5a

For a sub-region with width $W_1$ and height $H_1$ in a top neighboring area, a sub-region with width $W_2$ and height $H_2$ in a left neighboring area, a sub-region with width $W_3$ and height $H_3$ in a top-left neighboring area, or a sub-region with width $W_4$ and height $H_4$ in a top-right neighboring area, if a reconstructed pixel value $P_{cur}$ at position (i, j) and its available surrounding pixels ($P_1$, $P_r$, $P_t$ and $P_d$) at position (i−1, j), (i+1, j), (I, j−1), and (i, j+1), respectively, meet one of the conditions, then mark the current pixel at position (i, j) as a jump point:

Condition 1: If a difference between $P_{cur}$ and $P_1$, $P_r$, $P_t$, or $P_d$ is larger than a threshold $Thr1_1$, meaning $\max\{P_{cur}-P_1, P_{cur}-P_r, P_{cur}-P_t, P_{cur}-P_d\}$ is greater than $Thr1_1$, then the pixel at position in (i, j) is a jump point.

Condition 2: If one of an absolute difference between $P_{cur}$ and $P_1$, $P_r$, $P_t$, or $P_d$ is larger than a threshold $Thr1_2$, meaning $\max\{abs(P_{cur}-P_1), abs(P_{cur}-P_r), abs(P_{cur}-P_t), abs(P_{cur}-P_d)\}$ is greater than $Thr1_2$, then the pixel at position (i, j) is a jump point.

Condition 3: If a difference between $P_{cur}$ and $P_{avg}$ is smaller than a threshold $Thr1_3$, then the pixel at position (i, j) is a jump point. $P_{avg}$ is an average pixel value of the sub-region.

The terms "pixel" and "sample" may be used interchangeably.

Example 5b

A sub-region may be classified as a noise region when one of the following conditions is true:

Condition 1: All pixels in the sub-region are jump points.

Condition 2: A total number of jump points in the sub-region is larger than $Thr1_4*(W_1*H_1, W_2*H_2, W_3*H_3, \text{or } W_4*H_4)$.

Example 5c $Thr1_4$ may be set as a fixed value achieved by data training or may adaptively depend on the sub-region size.

Example 6

A sub-region may be classified as a smooth region based on identification of normal points.

Example 6a

For a sub-region with width w and height h in a top, left, top-left, top-right, or non-adjacent neighboring area, if the reconstructed pixel value $P_{cur}$ at position (i, j) and its available surrounding pixels ($P_1$, $P_r$, $P_t$ and $P_d$) at position (i−1, j), (i+1, j), (i, j−1), and (i, j+1) meet one of the following conditions, then mark the current pixel at position (i, j) as a normal point:

Condition 1: If a minimum absolute difference between $P_{cur}$ and $P_1$, $P_r$, $P_t$, and $P_d$ is smaller than a threshold $Thr2^1$, meaning $\min\{abs(P_{cur}-P_1), abs(P_{cur}-P_r), abs(P_{cur}-P_t), abs(P_{cur}-P_d)\}$ is smaller than $Thr2^1$, then the pixel at position in (i, j) is a normal point.

Condition 2: If a difference between $P_{cur}$ and $P_{avg}$ is smaller than a threshold $Thr2^2$, then the pixel at position (i, j) is a normal point. $P_{avg}$ is an average pixel value of the sub-region.

Example 6b

A sub-region may be classified as a smooth region when one of the following conditions is true:

Condition 1: All pixels in the sub-region are normal points.

Condition 2: A total number of normal points in the sub-region is larger than $Thr2_3*(W_1*H_1$ or $W_2*H_2)$.

Example 7

A sub-region may be classified as an edge region based on identification of edge pixels.

Example 7a

For a sub-region with width w and height h in a top, left, top-left, top-right, or non-adjacent neighboring area, the sub-region may be classified as an edge region when one of the following conditions is true:

Condition 1: All pixels in the sub-region are edge pixels. Edge pixels may be defined as pixels that abut a boundary such as a block boundary or a sub-region boundary.

Condition 2: A total number of edge pixels in the sub-region is larger than a threshold $Thr3_1*(W_1*H_1, W_2*H_2, W_3*H_3)$.

Example 8

A transform kernel of a current block is selected according to classification information of a sub-region or other side information of the sub-region such as block size or prediction mode.

Example 8a

A transform kernel for a horizontal transform or a vertical transform of a luma component may be DCT2 or DCT7.

Example 8b

A transform kernel for a horizontal transform or a vertical transform of a luma component is DCT2 when one of the following conditions is true:

Condition 1:All sub-regions in a top neighboring area and a top-left neighboring area are noise regions.

Condition 2: All sub-regions in a top neighboring area are noise regions.

Condition 3: The ratio of noise regions to a total number of sub-regions in a top neighboring area and the ratio of noise regions to a total number of sub-regions in a top-left neighboring area are both larger than a threshold $Thr4_1$.

Condition 4: The ratio of noise regions to a total sub-regions in a top neighboring area is larger than a threshold $Thr4_2$.

Condition 5: All sub-regions in a top neighboring area and a top-left neighboring area are edge regions, a current block is an intra block, and a block size of the current block is smaller than a block size of sub-region in the top neighboring area.

Condition 6: All sub-regions in a top neighboring area and a top-left neighboring area are edge regions, a current block is an intra block, and a total partition depth of a coding tree unit (CTU), which is partitioned to create a current block, is larger than a block size of any sub-region in the top neighboring area.

Example 8c

A transform kernel for a horizontal transform or a vertical transform of a luma component is DCT7 when one of the following conditions is true:

Condition 1: All sub-regions in a left neighboring area and a top neighboring area are smooth regions, and a current prediction mode of a current block is DC mode.

Condition 2: All sub-regions in a left neighboring area and a top neighboring are smooth regions, and a current prediction mode is of a current block is planar mode.

Example 9

Luma, Cb, or Cr samples in a neighboring area may be used to determine a transform kernel of a luma, Cb, or Cr sample in a current block.

Example 9a

Luma samples in a neighboring area may be used to determine a transform kernel of all components of a current block.

Example 10

Whether or how to use FTS may depend on block dimensions or a syntax element signaled in a bitstream. For instance, an indication of whether to apply FTS is signaled in the bitstream.

Figure 9:
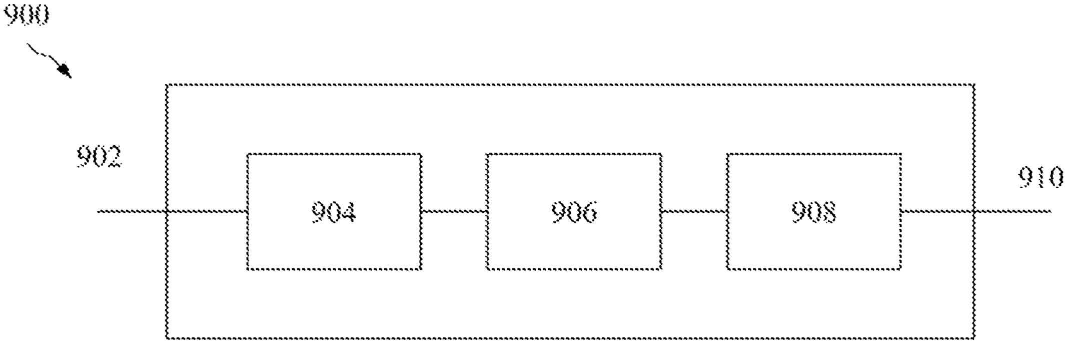
FIG. 9 is a block diagram showing an example video processing system in which various techniques disclosed herein may be implemented.

FIG. 9 is a block diagram showing an example video processing system 900 in which various techniques disclosed herein may be implemented. Various implementations may include some or all of the components of the system 900. The system 900 may include input 902 for receiving video content. The video content may be received in a raw or uncompressed format, e.g., 8 or 10 bit multi-component pixel values, or may be in a compressed or encoded format. The input 902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 900 may include a coding component 904 that may implement the various coding or encoding methods described in the present document. The coding component 904 may reduce the average bitrate of video from the input 902 to the output of the coding component 904 to produce a coded representation of the video. The coding techniques are therefore sometimes called video compression or video transcoding techniques. The output of the coding component 904 may be either stored, or transmitted via a communication connected, as represented by the component 906. The stored or communicated bitstream (or coded) representation of the video received at the input 902 may be used by a component 908 for generating pixel values or displayable video that is sent to a display interface 910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include Serial Advanced Technology Attachment (SATA), Peripheral Component Interconnect (PCI), Integrated Drive Electronics (IDE) interface, and the like. The techniques described in the present document may be embodied in various electronic devices such as mobile phones, laptops, smartphones or other devices that are capable of performing digital data processing and/or video display.

Figure 10:
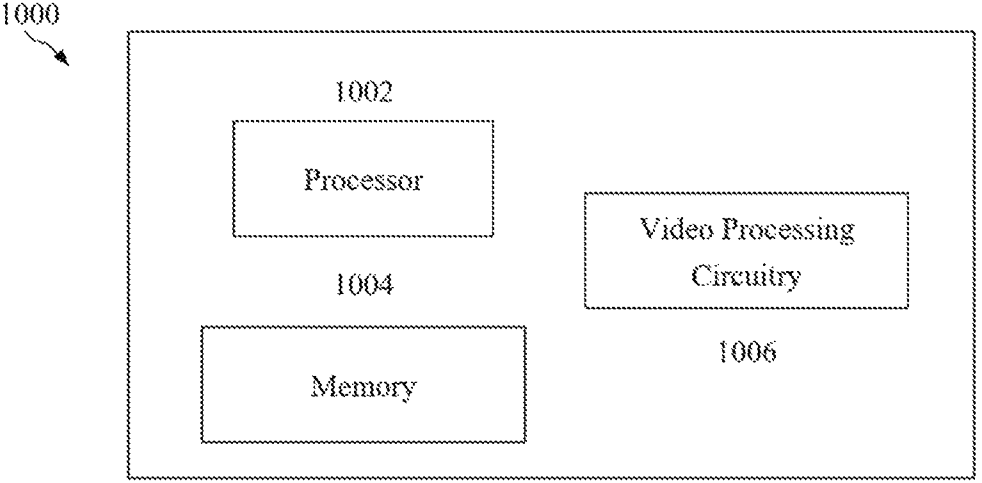
FIG. 10 is a block diagram of an example video processing apparatus.

FIG. 10 is a block diagram of an example video processing apparatus 1000. The apparatus 1000 may be used to implement one or more of the methods described herein. The apparatus 1000 may be embodied in a smartphone, tablet, computer, internet of things (IoT) receiver, and so on. The apparatus 1000 may include one or more processors 1002, one or more memories 1004 and video processing hardware 1006. The processor(s) 1002 may be configured to implement one or more methods described in the present document. The memory (memories) 1004 may be used for storing data and code used for implementing the methods and techniques described herein. The video processing hardware 1006 may be used to implement, in hardware circuitry, some techniques described in the present document. In some embodiments, the video processing hardware 1006 may be at least partly included in the processor 1002, e.g., a graphics co-processor.

Figure 11:
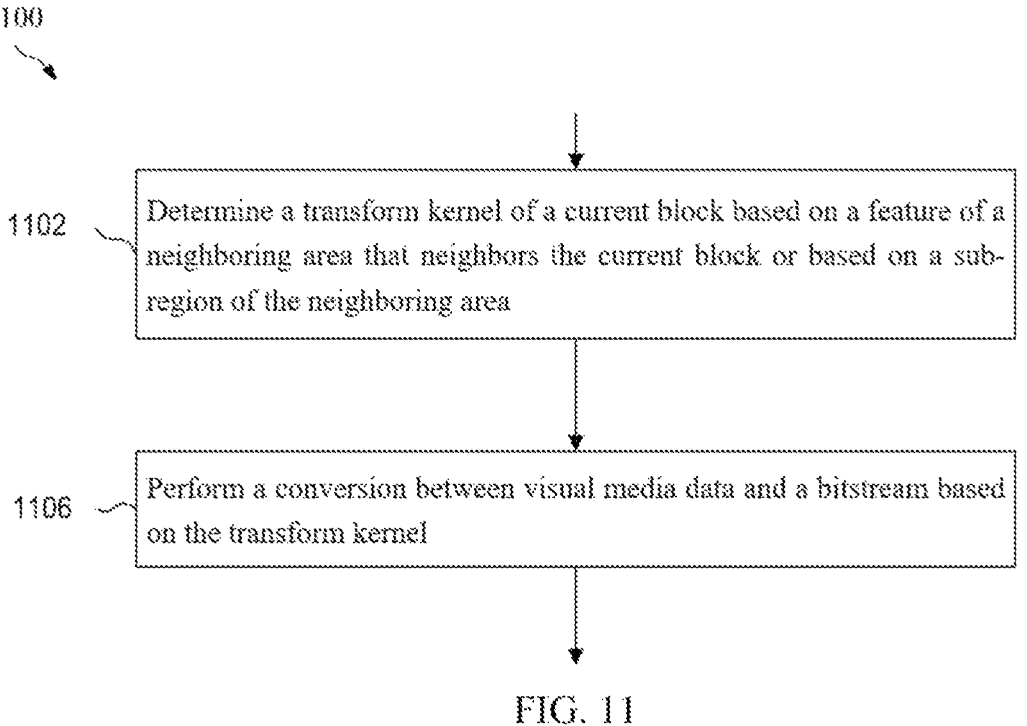
FIG. 11 is a flowchart for an example method of video processing.

FIG. 11 is a flowchart for an example method 1100 of video processing. At step 1102, a transform kernel of a current block is determined (e.g., signaled) based on a feature of a neighboring area that neighbors the current block or based on a sub-region of the neighboring area. At step 1104, a conversion between visual media data and a bitstream is performed based on the transform kernel.

The neighboring area may be adjacent to the current block or non-adjacent to the current block. The neighboring area may be a top neighboring area, a left neighboring area, a top-left neighboring area, or a top-right neighboring area. A size of the neighboring area may be predetermined, assigned according to a size of the current block, or assigned according to an intra mode of the current block. A sub-region may be included in a neighboring area based on a top-left sample of the sub-region.

The method 1100 may further comprise extracting the feature from a reconstructed sample in the sub-region. The feature may be based on classification information of the sub-region. The classification information may be that the sub-region is a noise region, a smooth region, or an edge region. The feature may be based on a difference between a first sample in one region and a second sample surrounding the first sample, by an average of a set of samples, or by edge information.

The method 1100 may further comprise classifying the sub-region as the noise region based on identification of jump points in the sub-region, classifying the sub-region as the smooth region based on identification of normal points in the sub-region, or classifying the sub-region as the edge region based on identification of edge pixels in the sub-region. The feature may be based on side information of the sub-region. The side information may be a block size. The side information may be a prediction mode. The transform kernel may be discrete cosine transform type two (DCT2). The transform kernel may be discrete cosine transform type seven (DCT7).

The method may further comprise determining whether to use feature-based transform selection (FTS) based on block dimensions or signaling in the bitstream. The method may further comprise determining how to use feature-based transform selection (FTS) based on block dimensions or signaling in the bitstream.

Figure 12:
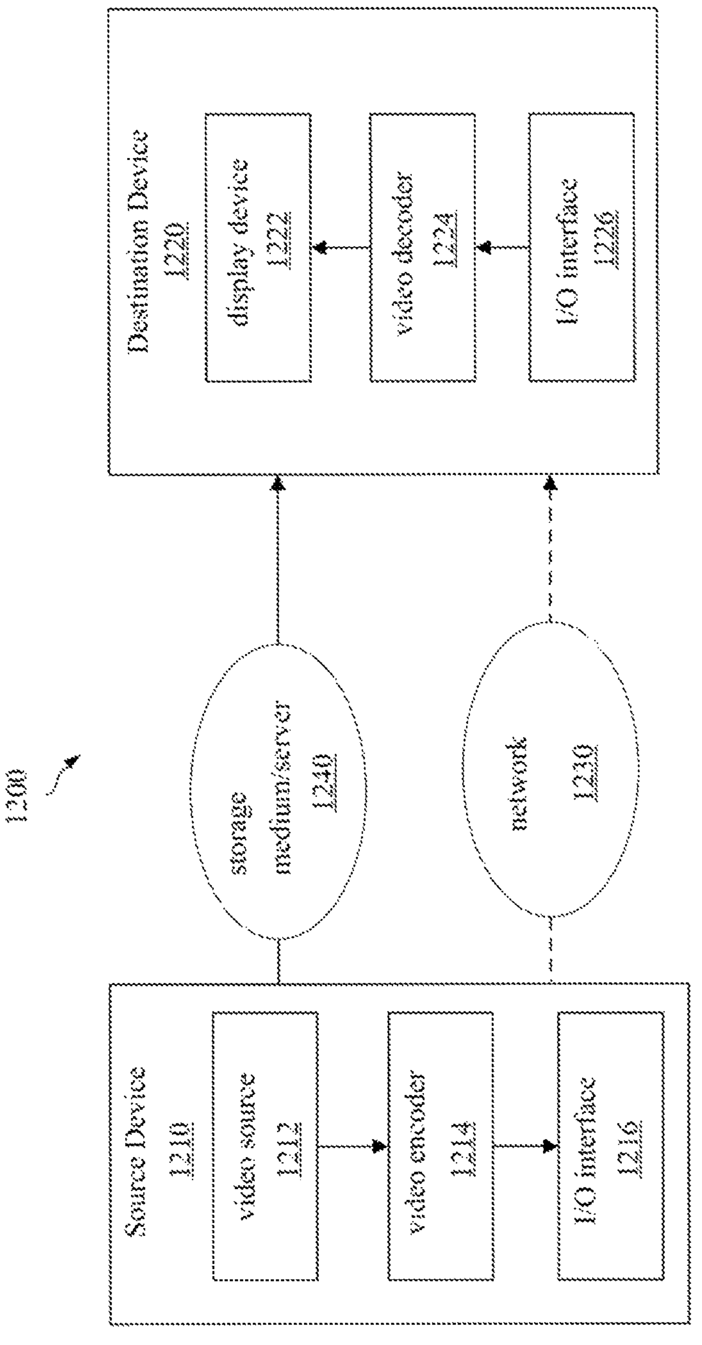
FIG. 12 is a block diagram that illustrates an example video coding system that may utilize the techniques of this disclosure.

FIG. 12 is a block diagram that illustrates an example video coding system 1200 that may utilize the techniques of this disclosure. As shown in FIG. 12, video coding system 1200 may include a source device 1210 and a destination device 1220. Source device 1210 generates encoded video data which may be referred to as a video encoding device. Destination device 1220 may decode the encoded video data generated by source device 1210 which may be referred to as a video decoding device.

Source device 1210 may include a video source 1212, a video encoder 1214, and an input/output (I/O) interface 1216. Video source 1212 may include a source such as a video capture device, an interface to receive video data from a video content provider, and/or a computer graphics system for generating video data, or a combination of such sources. The video data may comprise one or more pictures. Video encoder 1214 encodes the video data from video source 1212 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 1216 may include a modulator/demodulator (modem) and/or a transmitter. The encoded video data may be transmitted directly to destination device 1220 via I/O interface 1216 through network 1230. The encoded video data may also be stored onto a storage medium/server 1240 for access by destination device 1220.

Destination device 1220 may include an I/O interface 1226, a video decoder 1224, and a display device 1222. I/O interface 1226 may include a receiver and/or a modem. I/O interface 1226 may acquire encoded video data from the source device 1210 or the storage medium/server 1240. Video decoder 1224 may decode the encoded video data. Display device 1222 may display the decoded video data to a user. Display device 1222 may be integrated with the destination device 1220, or may be external to destination device 1220, which can be configured to interface with an external display device.

Video encoder 1214 and video decoder 1224 may operate according to a video compression standard, such as the High Efficiency Video Coding (HEVC) standard, Versatile Video Coding (VVC) standard and other current and/or further standards.

Figure 13:
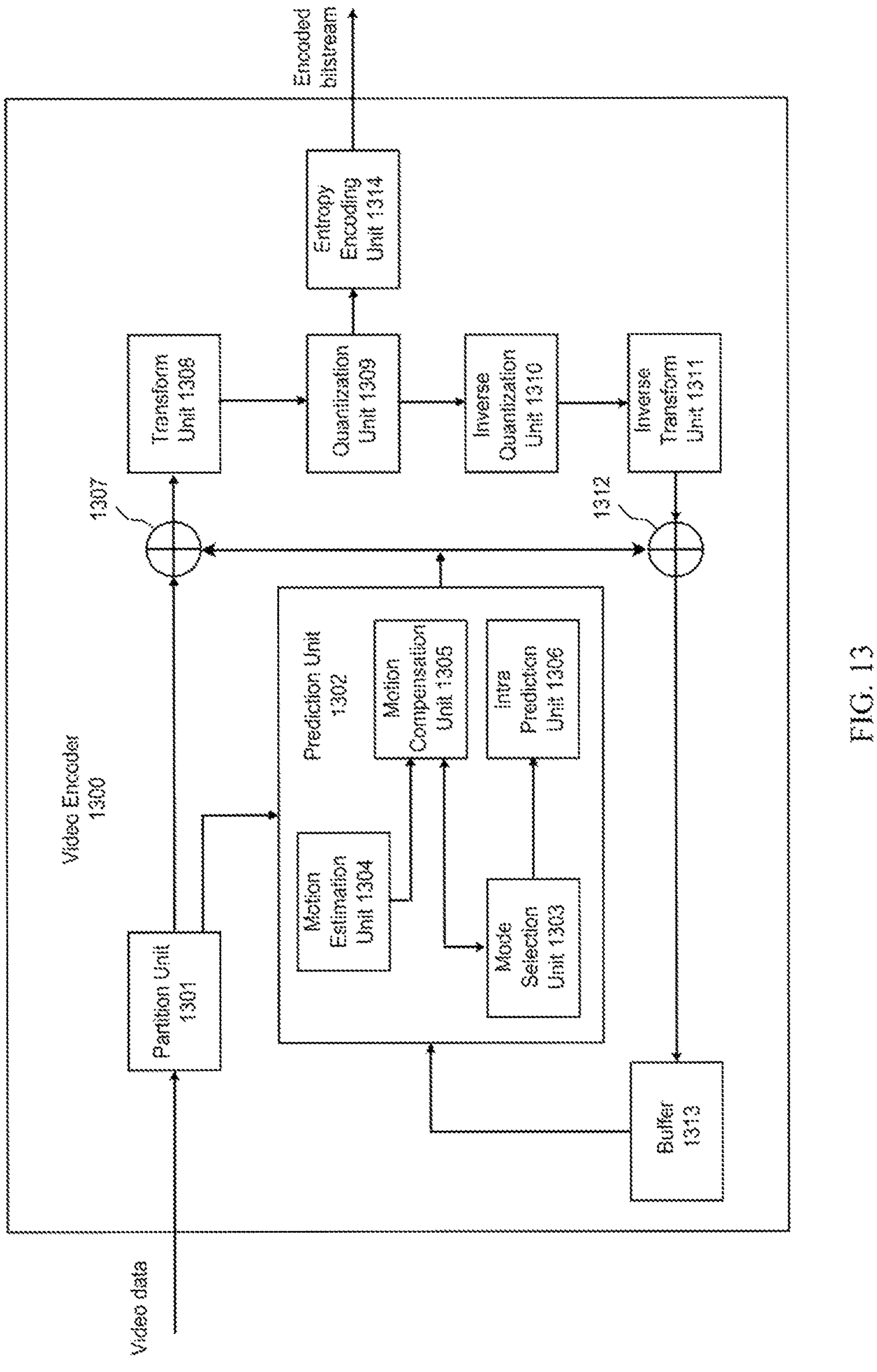
FIG. 13 is a block diagram illustrating an example of video encoder, which may be video encoder in the system illustrated in FIG. 12.

FIG. 13 is a block diagram illustrating an example of video encoder 1300, which may be video encoder 1214 in the system 1200 illustrated in FIG. 12. Video encoder 1300 may be configured to perform any or all of the techniques of this disclosure. In the example of FIG. 13, video encoder 1300 includes a plurality of functional components. The techniques described in this disclosure may be shared among the various components of video encoder 1300. In some examples, a processor may be configured to perform any or all of the techniques described in this disclosure.

The functional components of video encoder 1300 may include a partition unit 1301, a prediction unit 1302 which may include a mode selection unit 1303, a motion estimation unit 1304, a motion compensation unit 1305, an intra prediction unit 1306, a residual generation unit 1307, a transform processing unit 1308, a quantization unit 1309, an inverse quantization unit 1310, an inverse transform unit 1311, a reconstruction unit 1312, a buffer 1313, and an entropy encoding unit 1314.

In other examples, video encoder 1300 may include more, fewer, or different functional components. In an example, prediction unit 1302 may include an intra block copy (IBC) unit. The IBC unit may perform prediction in an IBC mode in which at least one reference picture is a picture where the current video block is located.

Furthermore, some components, such as motion estimation unit 1304 and motion compensation unit 1305 may be highly integrated, but are represented in the example of FIG. 13 separately for purposes of explanation.

Partition unit 1301 may partition a picture into one or more video blocks. Video encoder 1200 and video decoder 1300 may support various video block sizes.

Mode selection unit 1303 may select one of the coding modes, intra or inter, e.g., based on error results, and provide the resulting intra or inter coded block to a residual generation unit 1307 to generate residual block data and to a reconstruction unit 1312 to reconstruct the encoded block for use as a reference picture. In some examples, mode selection unit 1303 may select a combination of intra and inter prediction (CIIP) mode in which the prediction is based on an inter prediction signal and an intra prediction signal. Mode selection unit 1303 may also select a resolution for a motion vector (e.g., a sub-pixel or integer pixel precision) for the block in the case of inter prediction.

To perform inter prediction on a current video block, motion estimation unit 1304 may generate motion information for the current video block by comparing one or more reference frames from buffer 1313 to the current video block. Motion compensation unit 1305 may determine a predicted video block for the current video block based on the motion information and decoded samples of pictures from buffer 1313 other than the picture associated with the current video block.

Motion estimation unit 1304 and motion compensation unit 1305 may perform different operations for a current video block, for example, depending on whether the current video block is in an I slice, a P slice, or a B slice.

In some examples, motion estimation unit 1304 may perform uni-directional prediction for the current video block, and motion estimation unit 1304 may search reference pictures of list 0 or list 1 for a reference video block for the current video block. Motion estimation unit 1304 may then generate a reference index that indicates the reference picture in list 0 or list 1 that contains the reference video block and a motion vector that indicates a spatial displacement between the current video block and the reference video block. Motion estimation unit 1304 may output the reference index, a prediction direction indicator, and the motion vector as the motion information of the current video block. Motion compensation unit 1305 may generate the predicted video block of the current block based on the reference video block indicated by the motion information of the current video block.

In other examples, motion estimation unit 1304 may perform bi-directional prediction for the current video block, motion estimation unit 1304 may search the reference pictures in list 0 for a reference video block for the current video block and may also search the reference pictures in list 1 for another reference video block for the current video block. Motion estimation unit 1304 may then generate reference indexes that indicate the reference pictures in list 0 and list 1 containing the reference video blocks and motion vectors that indicate spatial displacements between the reference video blocks and the current video block. Motion estimation unit 1304 may output the reference indexes and the motion vectors of the current video block as the motion information of the current video block. Motion compensation unit 1305 may generate the predicted video block of the current video block based on the reference video blocks indicated by the motion information of the current video block.

In some examples, motion estimation unit 1304 may output a full set of motion information for decoding processing of a decoder. In some examples, motion estimation unit 1304 may not output a full set of motion information for the current video. Rather, motion estimation unit 1304 may signal the motion information of the current video block with reference to the motion information of another video block. For example, motion estimation unit 1304 may determine that the motion information of the current video block is sufficiently similar to the motion information of a neighboring video block.

Figure 14:
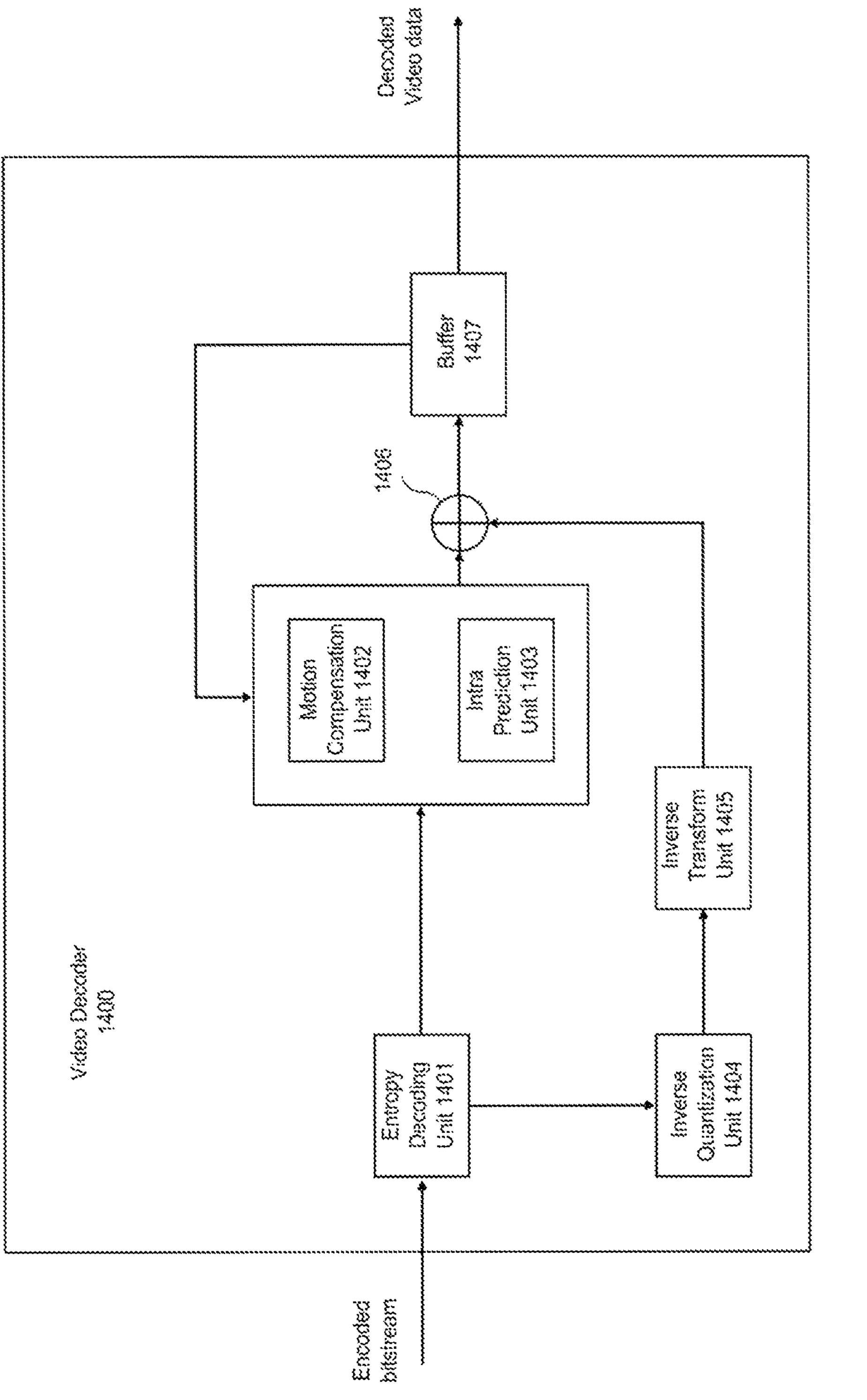
FIG. 14 is a block diagram illustrating an example of video decoder which may be video decoder in the system illustrated in FIG. 12.

In one example, motion estimation unit 1304 may indicate, in a syntax structure associated with the current video block, a value that indicates to the video decoder 1400 of FIG. 14 that the current video block has the same motion information as another video block.

In another example, motion estimation unit 1304 may identify, in a syntax structure associated with the current video block, another video block and a motion vector difference (MVD). The motion vector difference indicates a difference between the motion vector of the current video block and the motion vector of the indicated video block. The video decoder 1400 may use the motion vector of the indicated video block and the motion vector difference to determine the motion vector of the current video block.

As discussed above, video encoder 1300 may predictively signal the motion vector. Two examples of predictive signaling techniques that may be implemented by video encoder 1300 include advanced motion vector prediction (AMVP) and merge mode signaling.

Intra prediction unit 1306 may perform intra prediction on the current video block. When intra prediction unit 1306 performs intra prediction on the current video block, intra prediction unit 1306 may generate prediction data for the current video block based on decoded samples of other video blocks in the same picture. The prediction data for the current video block may include a predicted video block and various syntax elements.

Residual generation unit 1307 may generate residual data for the current video block by subtracting the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 1307 may not perform the subtracting operation.

Transform processing unit 1308 may generate one or more transform coefficient video blocks for the current video block by applying one or more transforms to a residual video block associated with the current video block.

After transform processing unit 1308 generates a transform coefficient video block associated with the current video block, quantization unit 1309 may quantize the transform coefficient video block associated with the current video block based on one or more quantization parameter (QP) values associated with the current video block.

Inverse quantization unit 1310 and inverse transform unit 1311 may apply inverse quantization and inverse transforms to the transform coefficient video block, respectively, to reconstruct a residual video block from the transform coefficient video block. Reconstruction unit 1312 may add the reconstructed residual video block to corresponding samples from one or more predicted video blocks generated by the prediction unit 1302 to produce a reconstructed video block associated with the current block for storage in the buffer 1313.

After reconstruction unit 1312 reconstructs the video block, the loop filtering operation may be performed to reduce video blocking artifacts in the video block.

Entropy encoding unit 1314 may receive data from other functional components of the video encoder 1300. When entropy encoding unit 1314 receives the data, entropy encoding unit 1314 may perform one or more entropy encoding operations to generate entropy encoded data and output a bitstream that includes the entropy encoded data.

FIG. 14 is a block diagram illustrating an example of video decoder 1400 which may be video decoder 1224 in the system 1200 illustrated in FIG. 12.

The video decoder 1400 may be configured to perform any or all of the techniques of this disclosure. In the example of FIG. 14, the video decoder 1400 includes a plurality of functional components. The techniques described in this disclosure may be shared among the various components of the video decoder 1400. In some examples, a processor may be configured to perform any or all of the techniques described in this disclosure.

In the example of FIG. 14, video decoder 1400 includes an entropy decoding unit 1401, a motion compensation unit 1402, an intra prediction unit 1403, an inverse quantization unit 1404, an inverse transformation unit 1405, a reconstruction unit 1406, and a buffer 1407. Video decoder 1400 may, in some examples, perform a decoding pass generally reciprocal to the encoding pass described with respect to video encoder 1300 (FIG. 13).

Entropy decoding unit 1401 may retrieve an encoded bitstream. The encoded bitstream may include entropy coded video data (e.g., encoded blocks of video data). Entropy decoding unit 1401 may decode the entropy coded video data, and from the entropy decoded video data, motion compensation unit 1402 may determine motion information including motion vectors, motion vector precision, reference picture list indexes, and other motion information. Motion compensation unit 1402 may, for example, determine such information by performing the AMVP and merge mode.

Motion compensation unit 1402 may produce motion compensated blocks, possibly performing interpolation based on interpolation filters. Identifiers for interpolation filters to be used with sub-pixel precision may be included in the syntax elements.

Motion compensation unit 1402 may use interpolation filters as used by video encoder 1300 during encoding of the video block to calculate interpolated values for sub-integer pixels of a reference block. Motion compensation unit 1402 may determine the interpolation filters used by video encoder 1300 according to received syntax information and use the interpolation filters to produce predictive blocks.

Motion compensation unit 1402 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter coded block, and other information to decode the encoded video sequence.

Intra prediction unit 1403 may use intra prediction modes for example received in the bitstream to form a prediction block from spatially adjacent blocks. Inverse quantization unit 1404 inverse quantizes, i.e., de-quantizes, the quantized video block coefficients provided in the bitstream and decoded by entropy decoding unit 1401. Inverse transform unit 1405 applies an inverse transform.

Reconstruction unit 1406 may sum the residual blocks with the corresponding prediction blocks generated by motion compensation unit 1402 or intra prediction unit 1403 to form decoded blocks. If desired, a deblocking filter may also be applied to filter the decoded blocks in order to remove blockiness artifacts. The decoded video blocks are then stored in buffer 1407, which provides reference blocks for subsequent motion compensation/intra prediction and also produces decoded video for presentation on a display device.

Figure 15:
FIG. 15 is a schematic diagram of an example encoder.
Figure 15:
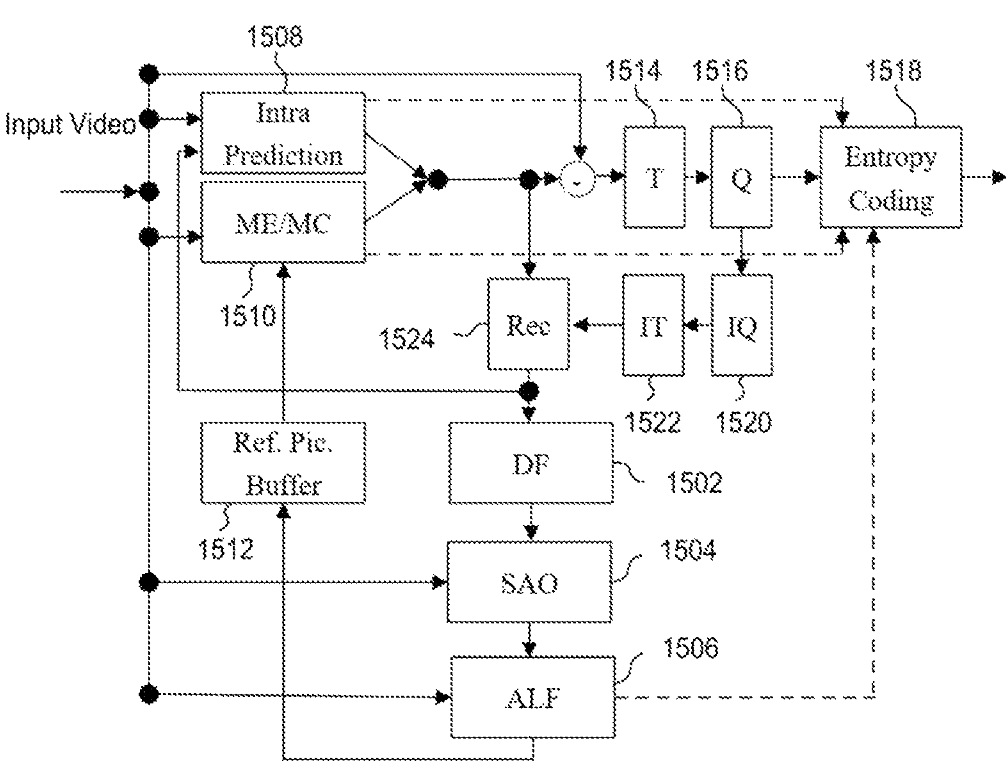

FIG. 15 is a schematic diagram of an example encoder 1500. The encoder 1500 is suitable for implementing the techniques of VVC. The encoder 1500 includes three in-loop filters, namely a deblocking filter (DF) 1502, a sample adaptive offset (SAO) 1504, and an adaptive loop filter (ALF) 1506. Unlike the DF 1502, which uses predefined filters, the SAO 1504 and the ALF 1506 utilize the original samples of the current picture to reduce the mean square errors between the original samples and the reconstructed samples by adding an offset and by applying a finite impulse response (FIR) filter, respectively, with coded side information signaling the offsets and filter coefficients. The ALF 1506 is located at the last processing stage of each picture and can be regarded as a tool trying to catch and fix artifacts created by the previous stages.

The encoder 1500 further includes an intra prediction component 1508 and a motion estimation/compensation (ME/MC) component 1510 configured to receive input video. The intra prediction component 1508 is configured to perform intra prediction, while the ME/MC component 1510 is configured to utilize reference pictures obtained from a reference picture buffer 1512 to perform inter prediction. Residual blocks from inter prediction or intra prediction are fed into a transform (T) component 1514 and a quantization (Q) component 1516 to generate quantized residual transform coefficients, which are fed into an entropy coding component 1518. The entropy coding component 1518 entropy codes the prediction results and the quantized transform coefficients and transmits the same toward a video decoder (not shown). Quantization components output from the quantization component 1516 may be fed into an inverse quantization (IQ) components 1520, an inverse transform (IT) component 1522, and a reconstruction (REC) component 1524. The REC component 1524 is able to output images to the DF 1502, the SAO 1504, and the ALF 1506 for filtering prior to those images being stored in the reference picture buffer 1512.

The following solutions show examples of techniques discussed herein.

1. A method of media data processing, comprising: determining, for a conversion between a current block of a video and a bitstream of the video, a transform used for the conversion according to a rule, and performing the conversion according to the determining; wherein the rule is based on one or more features of a neighboring area of the current block.
2. The method of solution 1, wherein the neighboring area comprises one or more blocks that are non-adjacent to current block.
3. The method of any of solutions 1-2, wherein the neighboring area comprises one or more blocks that are adjacent to the current block.
4. The method of solution 1, wherein the neighboring area includes a top area or a left area or a top-left area or a top-right area of the current block.

5. The method of solution 4, wherein the top area or the left area or the top-left area or the top-right area is rectangular in shape.
6. The method of any of solutions 1-5, wherein the one or more features of the neighboring area are from one or more sub-regions of the neighboring area.
7. The method of any of solutions 1-6, wherein the one or more features of the neighboring area are determined by classifying one or more sub-regions of the neighboring into categories and selecting a transform kernel therefrom.
8. The method of solution 7, wherein the classifying depends on a feature extracted from a sub-region of a neighboring area of the current block.
9. The method of solution 8, wherein the feature comprises an edge feature or an average sample value of the sub-region of the neighboring area.
10. The method of any of solutions 7-9, wherein a category of the categories corresponds to a noise region category.
11. The method of any of solutions 7-10, wherein a category of the classifying is based on determined whether a current pixel of the sub-region is a jump point.
12. The method of any of solutions 7-11, wherein a category of the categories corresponds to a smooth region category.
13. The method of any of solutions 7-12, wherein a category of the classifying is based on determined whether a current pixel of the sub-region is a normal point.
14. The method of any of solutions 7-13, wherein a category of the categories corresponds to an edge region category.
15. The method of any of solutions 7-14, wherein a category of the classifying is based on determined whether a current pixel of the sub-region is an edge pixel.
16. The method of any of solutions 1-15, wherein the rule is based on side information of the neighboring area.
17. The method of solution 16, wherein the side information includes a block size or a prediction mode of the neighboring area.
18. The method of solution 16, wherein the side information is used for determining the transform in a horizontal and/or in a vertical direction.
19. The method of any of solutions 1-18, wherein the rule defines that the transform used for the conversion of a first color component is based on the one or more features of the neighboring area for the first color component.
20. The method of any of solutions 1-18, wherein the rule defines that the transform used for the conversion of a first color component is based on the one or more features of the neighboring area for a second color component different from the first color component.
21. The method of any of solutions 1-19, wherein the rule further specifies that the determining is performed responsive to a dimension of the current block.
22. The method of any of solutions 1-19, wherein the rule further specifies that a syntax element is indicated about application of the rule for the conversion.
23. The method of any of solutions 1-21, wherein the conversion includes generating the video from the bitstream or generating the bitstream from the video.
24. A method of storing a bitstream on a computer-readable medium, comprising generating a bitstream according to a method recited in any one or more of solutions 1-22 and storing the bitstream on the computer-readable medium.
25. A computer-readable medium having a bitstream of a video stored thereon, the bitstream, when processed by a processor of a video decoder, causing the video decoder to generate the video, wherein the bitstream is generated according to a method recited in one or more of solutions 1-23.
26. A video decoding apparatus comprising a processor configured to implement a method recited in one or more of solutions 1-23.
27. A video encoding apparatus comprising a processor configured to implement a method recited in one or more of solutions 1-23.
28. A computer program product having computer code stored thereon, the code, when executed by a processor, causes the processor to implement a method recited in any of solutions 1-23.
29. A computer readable medium on which a bitstream complying to a bitstream format that is generated according to any of solutions 1-23.
30. A method, an apparatus, a bitstream generated according to a disclosed method or a system described in the present document.

In the solutions described herein, an encoder may conform to the format rule by producing a coded representation according to the format rule. In the solutions described herein, a decoder may use the format rule to parse syntax elements in the coded representation with the knowledge of presence and absence of syntax elements according to the format rule to produce decoded video.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc read-only memory (CD ROM) and Digital versatile disc-read only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly connected or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for processing visual data, comprising:

applying, for a current block of a video, a feature-based transform selection (FTS) method based on a block dimension of the current block, wherein, in the FTS method, a transform kernel used for the current block is selected according to a feature extracted from a neighboring area that neighbors the current block; and performing a conversion between the video and a bitstream of the video based on the selected transform kernel, wherein the feature for selecting the transform kernel is based on classification information of a sub-region of the neighboring area, and wherein the classification information is that the sub-region is a noise region, a smooth region, or an edge region.

2. The method of claim 1, wherein the neighboring area is adjacent to the current block or non-adjacent to the current block;

wherein the neighboring area is a top neighboring area, a left neighboring area, a top-left neighboring area, or a top-right neighboring area; and wherein a size of the neighboring area is predetermined, assigned according to a size of the current block, or assigned according to an intra mode of the current block.

3. The method of claim 1, wherein the sub-region is included in the neighboring area based on a top-left sample of the sub-region.

4. The method of claim 1, further comprising extracting the feature from a reconstructed sample in the sub-region.

5. The method of claim 1, wherein the feature is based on a difference between a first sample in one region and a second sample surrounding the first sample, by an average of a set of samples or by edge information.

6. The method of claim 1, further comprising classifying the sub-region as the noise region based on identification of jump points in the sub-region.

7. The method of claim 1, further comprising classifying the sub-region as the smooth region based on identification of normal points in the sub-region.

8. The method of claim 1, further comprising classifying the sub-region as the edge region based on identification of edge pixels in the sub-region.

9. The method of claim 1, wherein the feature is based on side information of the sub-region.

10. The method of claim 9, wherein the side information is a block size or a prediction mode of the current block.

11. The method of claim 1, wherein the transform kernel is discrete cosine transform type two (DCT2) and a discrete cosine transform type seven (DCT7).

12. The method of claim 1, wherein an X-component sample in the neighboring area is used to determine the transform kernel of an X-component of the current block, and wherein X is luma or Cb or Cr.

13. The method of claim 1, wherein a luma component sample in the neighboring area is used to determine the transform kernel of all components of current block.

14. The method of claim 1, wherein whether to applying the FTS method is indicated by at least one syntax element signaled in the bitstream.

15. The method of claim 1, wherein the conversion includes encoding the video into the bitstream.

16. The method of claim 1, wherein the conversion includes decoding the video from the bitstream.

17. An apparatus for processing video data comprising a processor and a non-transitory memory with instructions thereon, wherein the instructions upon execution by the processor, cause the processor to:

apply, for a current block of a video, a feature-based transform selection (FTS) method based on a block dimension of the current block, wherein, in the FTS method, a transform kernel used for the current block is selected according to a feature extracted from a neighboring area that neighbors the current block; and perform a conversion between the video and a bitstream of the video based on the selected transform kernel, wherein the feature for selecting the transform kernel is based on classification information of a sub-region of the neighboring area, and wherein the classification information is that the sub-region is a noise region, a smooth region, or an edge region.

18. A non-transitory computer-readable recording medium storing a bitstream of a video which is generated by a method performed by a video processing apparatus, wherein the method comprises:

applying, for a current block of the video, a feature-based transform selection (FTS) method based on a block dimension of the current block, wherein, in the FTS method, a transform kernel used for the current block is selected according to a feature extracted from a neighboring area that neighbors the current block; and generating the bitstream based on the selected transform kernel, wherein the feature for selecting the transform kernel is based on classification information of a sub-region of the neighboring area, and wherein the classification information is that the sub-region is a noise region, a smooth region, or an edge region.

19. The apparatus of claim 17, wherein the neighboring area is adjacent to the current block or non-adjacent to the current block;

wherein the neighboring area is a top neighboring area, a left neighboring area, a top-left neighboring area, or a top-right neighboring area; and wherein a size of the neighboring area is predetermined, assigned according to a size of the current block, or assigned according to an intra mode of the current block.

20. The non-transitory computer-readable recording medium of claim 18, wherein the neighboring area is adjacent to the current block or non-adjacent to the current block;

wherein the neighboring area is a top neighboring area, a left neighboring area, a top-left neighboring area, or a top-right neighboring area; and wherein a size of the neighboring area is predetermined, assigned according to a size of the current block, or assigned according to an intra mode of the current block.

* * * * *